United States Patent
Mueller

(10) Patent No.: US 10,767,050 B2
(45) Date of Patent: Sep. 8, 2020

(54) LIQUID HIGH SOLIDS BINDER COMPOSITION

(71) Applicants: Knauf Insulation SPRL, Vise (BE); Knauf Insulation, Inc., Shelbyville, IN (US)

(72) Inventor: Gert Mueller, New Albany, OH (US)

(73) Assignees: Knauf Insulation, Inc., Shelbyville, IN (US); Knauf Insulation SPRL, Vise (BE)

(*) Notice: Subject to any disclaimer, the term of this patent is extended or adjusted under 35 U.S.C. 154(b) by 114 days.

(21) Appl. No.: 15/822,102

(22) Filed: Nov. 24, 2017

(65) Prior Publication Data

US 2018/0142099 A1    May 24, 2018

Related U.S. Application Data

(63) Continuation of application No. 14/116,048, filed as application No. PCT/EP2012/058322 on May 6, (Continued)

(51) Int. Cl.
| | |
|---|---|
| *C08J 5/10* | (2006.01) |
| *C08L 79/02* | (2006.01) |
| *C08G 12/00* | (2006.01) |
| *C08G 14/00* | (2006.01) |
| *C08G 16/00* | (2006.01) |
| *C08L 61/00* | (2006.01) |

(Continued)

(52) U.S. Cl.
CPC .............. *C08L 79/02* (2013.01); *B29C 70/06* (2013.01); *C03C 25/32* (2013.01); *C08G 12/00* (2013.01); *C08G 14/00* (2013.01); *C08G 16/00* (2013.01); *C08J 5/043* (2013.01); *C08L 61/00* (2013.01)

(58) Field of Classification Search
CPC ......... B29C 70/06; C03C 25/32; C08G 12/00; C08G 14/00; C08G 16/00; C08J 5/043; C08L 61/00; C08L 79/02
See application file for complete search history.

(56) References Cited

U.S. PATENT DOCUMENTS

| | | |
|---|---|---|
| 1,801,052 A | 4/1931 | Meigs |
| 1,801,053 A | 4/1931 | Meigs |

(Continued)

FOREIGN PATENT DOCUMENTS

| | | |
|---|---|---|
| AU | 8538765 | 8/1985 |
| AU | 9640921 | 7/1997 |

(Continued)

OTHER PUBLICATIONS

International Search Report and Written Opinion for PCT/US2008/059730, completed Sep. 22, 2008.

(Continued)

*Primary Examiner* — Alexander M Weddle
(74) *Attorney, Agent, or Firm* — Knauf Insulation, Inc.; James K. Blodgett

(57) ABSTRACT

The invention described herein pertains to formaldehyde free, thermosetting liquid high solids binder compositions having rapid cure times on thermal curing and slow cure times at ambient temperatures so that the uncured binder compositions and products which comprise the uncured binder compositions have improved shelf lives.

44 Claims, 4 Drawing Sheets

Related U.S. Application Data 2012, now abandoned, which is a continuation of application No. PCT/EP2011/057363, filed on May 7, 2011.

(60) Provisional application No. 61/556,458, filed on Nov. 7, 2011.

(51) Int. Cl.
*B29C 70/06* (2006.01)
*C03C 25/32* (2018.01)
*C08J 5/04* (2006.01)

(56) References Cited

U.S. PATENT DOCUMENTS

| | | |
|---|---|---|
| 1,886,353 A | 11/1932 | Novotny |
| 1,902,948 A | 3/1933 | Castle |
| 1,964,263 A | 6/1934 | Krenke |
| 2,198,874 A | 4/1940 | Leighton |
| 2,215,825 A | 9/1940 | Wallace |
| 2,261,295 A | 11/1941 | Schlack |
| 2,362,086 A | 11/1944 | Eastes |
| 2,371,990 A | 3/1945 | Hanford |
| 2,392,105 A | 1/1946 | Sussman |
| 2,442,989 A | 6/1948 | Sussman |
| 2,500,665 A | 3/1950 | Courtright |
| 2,518,956 A | 8/1950 | Sussman |
| 2,875,073 A | 2/1959 | Gogek |
| 2,894,920 A | 7/1959 | Ramos |
| 2,965,504 A | 12/1960 | Gogek |
| 3,038,462 A | 6/1962 | Bohdan |
| 3,138,473 A | 6/1964 | Floyd |
| 3,222,243 A | 12/1965 | Gaston |
| 3,231,349 A | 1/1966 | Stalego |
| 3,232,821 A | 2/1966 | Banks |
| 3,297,419 A | 1/1967 | Eyre, Jr. |
| 3,513,001 A | 5/1970 | Woodhead |
| 3,551,365 A | 12/1970 | Matalon |
| 3,784,408 A | 1/1974 | Jaffe |
| 3,791,807 A | 2/1974 | Etzel |
| 3,802,897 A | 4/1974 | Bovier |
| 3,809,664 A | 5/1974 | Burr |
| 3,826,767 A | 7/1974 | Hoover |
| 3,856,606 A | 12/1974 | Fan |
| 3,867,119 A | 2/1975 | Takeo |
| 3,907,724 A | 9/1975 | Higginbottom |
| 3,911,048 A | 10/1975 | Nistri |
| 3,919,134 A | 11/1975 | Higginbottom |
| 3,922,466 A | 11/1975 | Bell |
| 3,955,031 A | 5/1976 | Jones |
| 3,956,204 A | 5/1976 | Higginbottom |
| 3,961,081 A | 6/1976 | McKenzie |
| 3,971,807 A | 7/1976 | Brack |
| 4,014,726 A | 3/1977 | Fargo |
| 4,028,290 A | 6/1977 | Reid |
| 4,048,127 A | 9/1977 | Gibbons |
| 4,054,713 A | 10/1977 | Sakaguchi |
| 4,085,076 A | 4/1978 | Gibbons |
| 4,097,427 A | 6/1978 | Aitken |
| 4,107,379 A | 8/1978 | Stofko |
| 4,109,057 A | 8/1978 | Nakamura |
| 4,144,027 A | 3/1979 | Habib |
| 4,148,765 A | 4/1979 | Nelson |
| 4,183,997 A | 1/1980 | Stofko |
| 4,184,986 A | 1/1980 | Krasnobajew |
| 4,186,053 A | 1/1980 | Krasnobajew |
| 4,201,247 A | 5/1980 | Shannon |
| 4,201,857 A | 5/1980 | Krasnobajew |
| 4,217,414 A | 8/1980 | Walon |
| 4,233,432 A | 11/1980 | Curtis, Jr. |
| 4,246,367 A | 1/1981 | Curtis, Jr. |
| 4,259,190 A | 3/1981 | Fahey |
| 4,265,963 A | 5/1981 | Matalon |
| 4,278,573 A | 7/1981 | Tessler |
| 4,296,173 A | 10/1981 | Fahey |
| 4,301,310 A | 11/1981 | Wagner |
| 4,310,585 A | 1/1982 | Shannon |
| 4,322,523 A | 3/1982 | Wagner |
| 4,330,443 A | 5/1982 | Rankin |
| 4,333,484 A | 6/1982 | Keritsis |
| 4,357,194 A | 11/1982 | Stofko |
| 4,361,588 A | 11/1982 | Herz |
| 4,379,101 A | 4/1983 | Smith |
| 4,393,019 A | 7/1983 | Geimer |
| 4,396,430 A | 8/1983 | Matalon |
| 4,400,496 A | 8/1983 | Butler, Jr. |
| 4,464,523 A | 8/1984 | Neigel |
| 4,506,684 A | 3/1985 | Keritsis |
| 4,520,143 A | 5/1985 | Jellinek |
| 4,524,164 A | 6/1985 | Viswanathan |
| 4,631,226 A | 12/1986 | Jellinek |
| 4,654,259 A | 3/1987 | Stofko |
| 4,668,716 A | 5/1987 | Pepe |
| 4,692,478 A | 9/1987 | Viswanathan |
| 4,714,727 A | 12/1987 | Hume, III |
| 4,720,295 A | 1/1988 | Bronshtein |
| 4,754,056 A | 6/1988 | Ansel |
| 4,761,184 A | 8/1988 | Markessini |
| 4,780,339 A | 10/1988 | Lacourse |
| 4,828,643 A | 5/1989 | Newman |
| 4,845,162 A | 7/1989 | Schmitt |
| 4,906,237 A | 3/1990 | Johansson |
| 4,912,147 A | 3/1990 | Pfoehler |
| 4,918,861 A | 4/1990 | Carpenter |
| 4,923,980 A | 5/1990 | Blomberg |
| 4,950,444 A | 8/1990 | Deboufie |
| 4,988,780 A | 1/1991 | Das |
| 4,992,519 A | 2/1991 | Mukherjee |
| 5,001,202 A | 3/1991 | Denis |
| 5,013,405 A | 5/1991 | Izard |
| 5,037,930 A | 8/1991 | Shih |
| 5,041,595 A | 8/1991 | Yang |
| 5,089,342 A | 2/1992 | Dhein |
| 5,095,054 A | 3/1992 | Lay |
| 5,106,615 A | 4/1992 | Dikstein |
| 5,114,004 A | 5/1992 | Isono |
| 5,123,949 A | 6/1992 | Thiessen |
| 5,124,369 A | 6/1992 | Vandichel |
| 5,128,407 A | 7/1992 | Layton |
| 5,143,582 A | 9/1992 | Arkens |
| 5,151,465 A | 9/1992 | Le-Khac |
| 5,167,738 A | 12/1992 | Bichot |
| 5,198,492 A | 3/1993 | Stack |
| 5,217,741 A | 6/1993 | Kawachi |
| 5,218,048 A | 6/1993 | Abe |
| 5,240,498 A | 8/1993 | Matalon |
| 5,278,222 A | 1/1994 | Stack |
| 5,300,144 A | 4/1994 | Adams |
| 5,300,192 A | 4/1994 | Hansen |
| 5,308,896 A | 5/1994 | Hansen |
| 5,318,990 A | 6/1994 | Strauss |
| 5,336,753 A | 8/1994 | Jung |
| 5,336,755 A | 8/1994 | Pape |
| 5,336,766 A | 8/1994 | Koga |
| 5,340,868 A | 8/1994 | Strauss |
| 5,352,480 A | 10/1994 | Hansen |
| 5,371,194 A | 12/1994 | Ferretti |
| 5,387,665 A | 2/1995 | Misawa |
| 5,389,716 A | 2/1995 | Graves |
| 5,393,849 A | 2/1995 | Srinivasan |
| 5,416,139 A | 5/1995 | Zeiszler |
| 5,421,838 A | 6/1995 | Gosset |
| 5,424,418 A | 6/1995 | Duflot |
| 5,434,233 A | 7/1995 | Kiely |
| 5,447,977 A | 9/1995 | Hansen |
| 5,470,843 A | 11/1995 | Stahl |
| 5,480,973 A | 1/1996 | Goodlad |
| 5,492,756 A | 2/1996 | Seale |
| 5,498,662 A | 3/1996 | Tanaka |
| 5,503,920 A | 4/1996 | Alkire |
| 5,534,612 A | 7/1996 | Taylor |
| 5,536,766 A | 7/1996 | Seyffer |
| 5,538,783 A | 7/1996 | Hansen |

(56) References Cited

U.S. PATENT DOCUMENTS

| | | |
|---|---|---|
| 5,543,215 A | 8/1996 | Hansen |
| 5,545,279 A | 8/1996 | Hall |
| 5,547,541 A | 8/1996 | Hansen |
| 5,547,745 A | 8/1996 | Hansen |
| 5,550,189 A | 8/1996 | Qin |
| 5,554,730 A | 9/1996 | Woiszwillo |
| 5,562,740 A | 10/1996 | Cook |
| 5,571,618 A | 11/1996 | Hansen |
| 5,578,678 A | 11/1996 | Hartmann |
| 5,580,856 A | 12/1996 | Prestrelski |
| 5,582,682 A | 12/1996 | Ferretti |
| 5,583,193 A | 12/1996 | Aravindakshan |
| 5,589,256 A | 12/1996 | Hansen |
| 5,589,536 A | 12/1996 | Golino |
| 5,607,759 A | 3/1997 | Hansen |
| 5,608,011 A | 3/1997 | Eck |
| 5,609,727 A | 3/1997 | Hansen |
| 5,614,570 A | 3/1997 | Hansen |
| 5,620,940 A | 4/1997 | Birbara |
| 5,621,026 A | 4/1997 | Tanaka |
| 5,633,298 A | 5/1997 | Arfaei |
| 5,641,561 A | 6/1997 | Hansen |
| 5,643,978 A | 7/1997 | Darwin |
| 5,645,756 A | 7/1997 | Dubin |
| 5,660,904 A | 8/1997 | Andersen |
| 5,661,213 A | 8/1997 | Arkens |
| 5,670,585 A | 9/1997 | Taylor |
| 5,672,418 A | 9/1997 | Hansen |
| 5,672,659 A | 9/1997 | Shalaby |
| 5,690,715 A | 11/1997 | Schiwek |
| 5,691,060 A | 11/1997 | Levy |
| 5,693,411 A | 12/1997 | Hansen |
| 5,719,092 A | 2/1998 | Arrington |
| 5,719,228 A | 2/1998 | Taylor |
| 5,756,580 A | 5/1998 | Natori |
| 5,763,524 A | 6/1998 | Arkens |
| 5,788,243 A | 8/1998 | Harshaw |
| 5,788,423 A | 8/1998 | Perkins |
| 5,807,364 A | 9/1998 | Hansen |
| 5,855,987 A | 1/1999 | Margel |
| 5,863,985 A | 1/1999 | Shalaby |
| 5,885,337 A | 3/1999 | Nohr |
| 5,895,804 A | 4/1999 | Lee |
| 5,905,115 A | 5/1999 | Luitjes |
| 5,916,503 A | 6/1999 | Rettenbacher |
| 5,919,528 A | 7/1999 | Huijs |
| 5,919,831 A | 7/1999 | Philipp |
| 5,922,403 A | 7/1999 | Tecle |
| 5,925,722 A | 7/1999 | Exner |
| 5,929,184 A | 7/1999 | Holmes-Farley |
| 5,929,196 A | 7/1999 | Kissel |
| 5,932,344 A | 8/1999 | Ikemoto |
| 5,932,665 A | 8/1999 | Deporter |
| 5,932,689 A | 8/1999 | Arkens |
| 5,942,123 A | 8/1999 | McArdle |
| 5,954,869 A | 9/1999 | Elfersy |
| 5,977,224 A | 11/1999 | Cheung |
| 5,977,232 A | 11/1999 | Arkens |
| 5,981,719 A | 11/1999 | Woiszwillo |
| 5,983,586 A | 11/1999 | Berdan, II |
| 5,990,216 A | 11/1999 | Cai |
| 5,993,709 A | 11/1999 | Bonomo |
| 6,022,615 A | 2/2000 | Rettenbacher |
| 6,067,821 A | 5/2000 | Jackson |
| 6,071,549 A | 6/2000 | Hansen |
| 6,071,994 A | 6/2000 | Hummerich |
| 6,072,086 A | 6/2000 | James |
| 6,077,883 A | 6/2000 | Taylor |
| 6,090,925 A | 7/2000 | Woiszwillo |
| 6,114,033 A | 9/2000 | Ikemoto |
| 6,114,464 A | 9/2000 | Reck |
| 6,133,347 A | 10/2000 | Vickers, Jr. |
| 6,136,916 A | 10/2000 | Arkens |
| 6,139,619 A | 10/2000 | Zaretskiy |
| 6,143,243 A | 11/2000 | Gershun |
| 6,171,444 B1 | 1/2001 | Nigam |
| 6,171,654 B1 | 1/2001 | Salsman |
| 6,180,037 B1 | 1/2001 | Andersen |
| 6,194,512 B1 | 2/2001 | Chen |
| 6,210,472 B1 | 4/2001 | Kwan |
| 6,221,958 B1 | 4/2001 | Shalaby |
| 6,221,973 B1 | 4/2001 | Arkens |
| 6,231,721 B1 | 5/2001 | Quick |
| 6,274,661 B1 | 8/2001 | Chen |
| 6,281,298 B1 | 8/2001 | Papsin, Jr. |
| 6,299,677 B1 | 10/2001 | Johnson |
| 6,299,936 B1 | 10/2001 | Reck |
| 6,307,732 B1 | 10/2001 | Tsubaki |
| 6,310,227 B1 | 10/2001 | Sarama |
| 6,313,102 B1 | 11/2001 | Colaco |
| 6,319,683 B1 | 11/2001 | James |
| 6,331,350 B1 | 12/2001 | Taylor |
| 6,331,513 B1 | 12/2001 | Zaid |
| 6,340,411 B1 | 1/2002 | Hansen |
| 6,348,530 B1 | 2/2002 | Reck |
| 6,365,079 B1 | 4/2002 | Winkler |
| 6,372,077 B1 | 4/2002 | Tecle |
| 6,379,739 B1 | 4/2002 | Formanek |
| 6,395,856 B1 | 5/2002 | Petty |
| 6,403,665 B1 | 6/2002 | Sieker |
| 6,407,225 B1 | 6/2002 | Mang |
| 6,410,036 B1 | 6/2002 | De Rosa |
| 6,440,204 B1 | 8/2002 | Rogols |
| 6,461,553 B1 | 10/2002 | Hansen |
| 6,468,442 B2 | 10/2002 | Bytnar |
| 6,468,730 B2 | 10/2002 | Fujiwara |
| 6,469,120 B1 | 10/2002 | Elfersy |
| 6,475,552 B1 | 11/2002 | Shah |
| 6,482,875 B2 | 11/2002 | Lorenz |
| 6,495,656 B1 | 12/2002 | Haile |
| 6,521,339 B1 | 2/2003 | Hansen |
| 6,525,009 B2 | 2/2003 | Sachdev |
| 6,538,057 B1 | 3/2003 | Wildburg |
| 6,547,867 B2 | 4/2003 | Rogols |
| 6,555,616 B1 | 4/2003 | Helbing |
| 6,559,302 B1 | 5/2003 | Shah |
| 6,562,267 B1 | 5/2003 | Hansen |
| 6,596,103 B1 | 7/2003 | Hansen |
| 6,613,378 B1 | 9/2003 | Erhan |
| 6,638,882 B1 | 10/2003 | Helbing |
| 6,638,884 B2 | 10/2003 | Quick |
| 6,699,945 B1 | 3/2004 | Chen |
| 6,706,853 B1 | 3/2004 | Stanssens |
| 6,719,862 B2 | 4/2004 | Quick |
| 6,730,730 B1 | 5/2004 | Hansen |
| 6,753,361 B2 | 6/2004 | Kroner |
| 6,818,694 B2 | 11/2004 | Hindi |
| 6,821,547 B2 | 11/2004 | Shah |
| 6,852,247 B2 | 2/2005 | Bytnar |
| 6,858,074 B2 | 2/2005 | Anderson |
| 6,861,495 B2 | 3/2005 | Barsotti |
| 6,864,044 B2 | 3/2005 | Ishikawa |
| 6,878,800 B2 | 4/2005 | Husemoen |
| 6,884,849 B2 | 4/2005 | Chen |
| 6,955,844 B2 | 10/2005 | Tagge |
| 6,962,714 B2 | 11/2005 | Hei |
| 6,989,171 B2 | 1/2006 | Portman |
| 6,992,203 B2 | 1/2006 | Trusovs |
| 7,018,490 B2 | 3/2006 | Hansen |
| 7,029,717 B1 | 4/2006 | Ojima |
| 7,067,579 B2 | 6/2006 | Taylor |
| 7,083,831 B1 | 8/2006 | Koch |
| 7,090,745 B2 | 8/2006 | Beckman |
| 7,141,626 B2 | 11/2006 | Rodrigues |
| 7,144,474 B1 | 12/2006 | Hansen |
| 7,195,792 B2 | 3/2007 | Boston |
| 7,201,778 B2 | 4/2007 | Smith |
| 7,201,825 B2 | 4/2007 | Dezutter |
| 7,202,326 B2 | 4/2007 | Kuroda |
| 7,241,487 B2 | 7/2007 | Taylor |
| 7,458,235 B2 | 12/2008 | Beaufils |
| 7,514,027 B2 | 4/2009 | Horres |
| 7,655,711 B2 | 2/2010 | Swift |
| 7,772,347 B2 | 8/2010 | Swift |

(56) References Cited

U.S. PATENT DOCUMENTS

| | | |
|---|---|---|
| 7,795,354 B2 | 9/2010 | Srinivasan |
| 7,803,879 B2 | 9/2010 | Srinivasan |
| 7,807,771 B2 | 10/2010 | Swift |
| 7,842,382 B2 | 11/2010 | Helbing |
| 7,854,980 B2 | 12/2010 | Jackson |
| 7,883,693 B2 | 2/2011 | Sehl |
| 7,888,445 B2 | 2/2011 | Swift |
| 7,947,765 B2 | 5/2011 | Swift |
| 8,114,210 B2 | 2/2012 | Hampson |
| 8,182,648 B2 | 5/2012 | Swift |
| 8,211,923 B2 | 7/2012 | Wagner |
| 8,372,900 B2 | 2/2013 | Shooshtari |
| 8,377,564 B2 | 2/2013 | Shooshtari |
| 8,501,838 B2 | 8/2013 | Jackson |
| 8,680,224 B2 | 3/2014 | Zhang |
| 8,691,934 B2 | 4/2014 | Helbing |
| 8,900,495 B2 | 12/2014 | Pacorel |
| 2001/0017427 A1 | 8/2001 | Rosthauser |
| 2001/0046824 A1 | 11/2001 | Nigam |
| 2002/0000100 A1 | 1/2002 | Burg |
| 2002/0025435 A1 | 2/2002 | Hansen |
| 2002/0026025 A1 | 2/2002 | Kuo |
| 2002/0028857 A1 | 3/2002 | Holy |
| 2002/0032253 A1 | 3/2002 | Lorenz |
| 2002/0042473 A1 | 4/2002 | Trollsas |
| 2002/0091185 A1 | 7/2002 | Taylor |
| 2002/0096278 A1 | 7/2002 | Foster |
| 2002/0123598 A1 | 9/2002 | Sieker |
| 2002/0130439 A1 | 9/2002 | Kroner |
| 2002/0161108 A1 | 10/2002 | Schultz |
| 2002/0197352 A1 | 12/2002 | Portman |
| 2003/0005857 A1 | 1/2003 | Minami |
| 2003/0040239 A1 | 2/2003 | Toas |
| 2003/0044513 A1 | 3/2003 | Shah |
| 2003/0066523 A1 | 4/2003 | Lewis |
| 2003/0071879 A1 | 4/2003 | Swenson |
| 2003/0116294 A1 | 6/2003 | Kehrer |
| 2003/0134945 A1 | 7/2003 | Capps |
| 2003/0148084 A1 | 8/2003 | Trocino |
| 2003/0153690 A1 | 8/2003 | Husemoen |
| 2003/0185991 A1 | 10/2003 | Wigger |
| 2003/0203117 A1 | 10/2003 | Bartkowiak |
| 2004/0002567 A1 | 1/2004 | Chen |
| 2004/0019168 A1 | 1/2004 | Soerens |
| 2004/0024170 A1 | 2/2004 | Husemoen |
| 2004/0033269 A1 | 2/2004 | Hei |
| 2004/0033747 A1 | 2/2004 | Miller |
| 2004/0034154 A1 | 2/2004 | Tutin |
| 2004/0038017 A1 | 2/2004 | Tutin |
| 2004/0048531 A1 | 3/2004 | Belmares |
| 2004/0077055 A1 | 4/2004 | Fosdick |
| 2004/0079499 A1 | 4/2004 | Dezutter |
| 2004/0087024 A1 | 5/2004 | Bellocq |
| 2004/0087719 A1 | 5/2004 | Rautschek |
| 2004/0122166 A1 | 6/2004 | O'Brien-Bernini |
| 2004/0131874 A1 | 7/2004 | Tutin |
| 2004/0144706 A1 | 7/2004 | Beaufils |
| 2004/0152824 A1 | 8/2004 | Dobrowolski |
| 2004/0161993 A1 | 8/2004 | Tripp |
| 2004/0209851 A1 | 10/2004 | Nelson |
| 2004/0213930 A1 | 10/2004 | Halabisky |
| 2004/0220368 A1 | 11/2004 | Li |
| 2004/0249066 A1 | 12/2004 | Heinzman |
| 2004/0254285 A1 | 12/2004 | Rodrigues |
| 2004/0260082 A1 | 12/2004 | Van Der Wilden |
| 2005/0001198 A1 | 1/2005 | Bytnar |
| 2005/0017394 A1 | 1/2005 | Hochsmann |
| 2005/0027283 A1 | 2/2005 | Richard |
| 2005/0033037 A1 | 2/2005 | Trusovs |
| 2005/0048212 A1 | 3/2005 | Clamen |
| 2005/0059770 A1 | 3/2005 | Srinivasan |
| 2005/0171085 A1 | 8/2005 | Pinto |
| 2005/0196421 A1 | 9/2005 | Hunter |
| 2005/0202224 A1 | 9/2005 | Helbing |
| 2005/0208852 A1 | 9/2005 | Weber |
| 2005/0215153 A1 | 9/2005 | Cossement |
| 2005/0245669 A1 | 11/2005 | Clungeon |
| 2005/0275133 A1 | 12/2005 | Cabell |
| 2005/0288479 A1 | 12/2005 | Kuroda |
| 2006/0005580 A1 | 1/2006 | Espiard |
| 2006/0044302 A1 | 3/2006 | Chen |
| 2006/0099870 A1 | 5/2006 | Garcia |
| 2006/0111480 A1 | 5/2006 | Hansen |
| 2006/0124538 A1 | 6/2006 | Morcrette |
| 2006/0135433 A1 | 6/2006 | Murray |
| 2006/0141177 A1 | 6/2006 | Ligtenberg |
| 2006/0179892 A1 | 8/2006 | Horres |
| 2006/0188465 A1 | 8/2006 | Perrier |
| 2006/0198954 A1 | 9/2006 | Frechem |
| 2006/0231487 A1 | 10/2006 | Bartley |
| 2006/0252855 A1 | 11/2006 | Pisanova |
| 2006/0281622 A1 | 12/2006 | Maricourt |
| 2007/0006390 A1 | 1/2007 | Clamen |
| 2007/0009582 A1 | 1/2007 | Madsen |
| 2007/0027281 A1 | 2/2007 | Michl |
| 2007/0039520 A1 | 2/2007 | Crews |
| 2007/0082983 A1 | 4/2007 | Crews |
| 2007/0123679 A1 | 5/2007 | Swift |
| 2007/0123680 A1 | 5/2007 | Swift |
| 2007/0129522 A1 | 6/2007 | Burckhardt |
| 2007/0142596 A1 | 6/2007 | Swift |
| 2007/0158022 A1 | 7/2007 | Heep |
| 2007/0184740 A1 | 8/2007 | Keller |
| 2007/0191574 A1 | 8/2007 | Miller |
| 2007/0270070 A1 | 11/2007 | Othman |
| 2007/0287018 A1 | 12/2007 | Tutin |
| 2007/0292618 A1 | 12/2007 | Srinivasan |
| 2007/0292619 A1 | 12/2007 | Srinivasan |
| 2007/0298274 A1 | 12/2007 | Eriksson |
| 2008/0009209 A1 | 1/2008 | Clamen |
| 2008/0009616 A1 | 1/2008 | Frank |
| 2008/0051539 A1 | 2/2008 | Kelly |
| 2008/0060551 A1 | 3/2008 | Crews |
| 2008/0081138 A1 | 4/2008 | Moore |
| 2008/0108741 A1 | 5/2008 | Van Herwijnen |
| 2008/0160260 A1 | 7/2008 | Wada |
| 2008/0160302 A1 | 7/2008 | Asrar |
| 2008/0194738 A1 | 8/2008 | Crews |
| 2009/0169867 A1 | 7/2009 | Kelly |
| 2009/0170978 A1 | 7/2009 | Kelly |
| 2009/0227732 A1 | 9/2009 | Glockner |
| 2009/0301972 A1 | 12/2009 | Hines |
| 2009/0304919 A1 | 12/2009 | Huenig |
| 2009/0306255 A1 | 12/2009 | Patel |
| 2009/0324915 A1 | 12/2009 | Swift |
| 2010/0029160 A1 | 2/2010 | Srinivasan |
| 2010/0058661 A1 | 3/2010 | Jackson |
| 2010/0080976 A1 | 4/2010 | Jackson |
| 2010/0084598 A1 | 4/2010 | Jackson |
| 2010/0086726 A1 | 4/2010 | Jackson |
| 2010/0087571 A1 | 4/2010 | Jackson |
| 2010/0098947 A1 | 4/2010 | Inoue |
| 2010/0117023 A1 | 5/2010 | Dopico |
| 2010/0129640 A1 | 5/2010 | Kelly |
| 2010/0130649 A1 | 5/2010 | Swift |
| 2010/0175826 A1 | 7/2010 | Huenig |
| 2010/0210595 A1 | 8/2010 | Wagner |
| 2010/0222463 A1 | 9/2010 | Brady |
| 2010/0222566 A1 | 9/2010 | Fosdick |
| 2010/0282996 A1 | 11/2010 | Jaffrennou |
| 2010/0301256 A1 | 12/2010 | Hampson |
| 2010/0320113 A1 | 12/2010 | Swift |
| 2011/0021672 A1 | 1/2011 | Crews |
| 2011/0039111 A1 | 2/2011 | Shooshtari |
| 2011/0040010 A1 | 2/2011 | Shooshtari |
| 2011/0042303 A1 | 2/2011 | Shooshtari |
| 2011/0045966 A1 | 2/2011 | Shooshtari |
| 2011/0089074 A1 | 4/2011 | Jackson |
| 2011/0135937 A1 | 6/2011 | Swift |
| 2011/0190425 A1 | 8/2011 | Swift |
| 2011/0220835 A1 | 9/2011 | Swift |
| 2011/0256790 A1 | 10/2011 | Toas |
| 2011/0260094 A1 | 10/2011 | Hampson |

(56) References Cited

U.S. PATENT DOCUMENTS

| | | | |
|---|---|---|---|
| 2011/0262648 A1* | 10/2011 | Lee | C08L 79/02 427/372.2 |
| 2011/0263757 A1* | 10/2011 | Rand | C08L 79/02 524/13 |
| 2011/0306726 A1 | 12/2011 | Bailey | |
| 2012/0133073 A1 | 5/2012 | Pacorel | |
| 2012/0156954 A1 | 6/2012 | Eckert | |
| 2013/0029150 A1 | 1/2013 | Appley | |
| 2013/0032749 A1 | 2/2013 | Jaffrennou | |
| 2013/0047888 A1 | 2/2013 | Mueller | |
| 2013/0059075 A1 | 3/2013 | Appley | |
| 2013/0082205 A1 | 4/2013 | Mueller | |
| 2013/0174758 A1 | 7/2013 | Mueller | |
| 2013/0234362 A1 | 9/2013 | Swift | |
| 2013/0236650 A1 | 9/2013 | Swift | |
| 2013/0237113 A1 | 9/2013 | Swift | |
| 2013/0244524 A1 | 9/2013 | Swift | |
| 2014/0091247 A1 | 4/2014 | Jackson | |
| 2014/0134909 A1 | 5/2014 | Guo | |
| 2014/0357787 A1 | 12/2014 | Jobber | |

FOREIGN PATENT DOCUMENTS

| | | |
|---|---|---|
| CA | 1090026 | 11/1980 |
| CA | 2037214 | 9/1991 |
| CA | 2232334 | 11/1998 |
| CA | 2458333 | 12/1999 |
| CA | 2278946 | 1/2000 |
| CA | 2470783 | 12/2004 |
| CN | 1251738 | 5/2000 |
| DE | 1905054 | 8/1969 |
| DE | 4142261 | 6/1993 |
| DE | 4233622 | 4/1994 |
| DE | 4308089 | 9/1994 |
| DE | 102004033561 | 9/2005 |
| DE | 102005023431 | 11/2006 |
| EP | 0044614 A2 | 1/1982 |
| EP | 0099801 | 2/1984 |
| EP | 354023 | 2/1990 |
| EP | 0461995 | 12/1991 |
| EP | 0524518 A2 | 1/1993 |
| EP | 0547819 A2 | 6/1993 |
| EP | 0583086 A1 | 2/1994 |
| EP | 0714754 A2 | 6/1996 |
| EP | 796681 | 9/1997 |
| EP | 0826710 A2 | 3/1998 |
| EP | 856494 | 8/1998 |
| EP | 0873976 A1 | 10/1998 |
| EP | 878135 | 11/1998 |
| EP | 0882756 A2 | 12/1998 |
| EP | 0911361 A1 | 4/1999 |
| EP | 915811 | 5/1999 |
| EP | 936060 | 8/1999 |
| EP | 976866 | 2/2000 |
| EP | 0990729 A1 | 4/2000 |
| EP | 1038433 A1 | 9/2000 |
| EP | 1193288 A1 | 4/2002 |
| EP | 1084167 | 9/2002 |
| EP | 1268702 | 1/2003 |
| EP | 1382642 | 1/2004 |
| EP | 1486547 A2 | 12/2004 |
| EP | 1522642 | 4/2005 |
| EP | 1698598 A1 | 9/2006 |
| EP | 1767566 | 4/2007 |
| EP | 2223941 | 9/2010 |
| EP | 2253663 | 11/2010 |
| FR | 2614388 | 10/1988 |
| GB | 809675 | 3/1959 |
| GB | 926749 | 5/1963 |
| GB | 1391172 | 4/1975 |
| GB | 1469331 | 4/1977 |
| GB | 1512066 | 5/1978 |
| GB | 1525541 | 9/1978 |
| GB | 2047258 | 11/1980 |
| GB | 2078805 A | 1/1982 |
| GB | 2173523 | 10/1986 |
| GB | 2251438 | 7/1992 |
| JP | 53113784 | 10/1978 |
| JP | 57101100 | 6/1982 |
| JP | 5811193 | 1/1983 |
| JP | 61195647 | 8/1986 |
| JP | 3-173680 | 7/1991 |
| JP | 05186635 | 7/1993 |
| JP | 7-034023 | 2/1995 |
| JP | 09157627 | 6/1997 |
| JP | 10234314 | 9/1998 |
| JP | 11035491 | 2/1999 |
| JP | 11181690 | 7/1999 |
| JP | 2000327841 | 11/2000 |
| JP | 2002293576 | 9/2002 |
| JP | 2003147276 | 5/2003 |
| JP | 2003238921 | 8/2003 |
| JP | 2004060058 | 2/2004 |
| JP | 2005306919 | 11/2005 |
| NZ | 549563 | 1/2008 |
| RU | 1765996 | 8/1995 |
| SU | 374400 | 3/1973 |
| WO | 1990007541 | 7/1990 |
| WO | 1992012198 | 7/1992 |
| WO | 1995034517 | 12/1995 |
| WO | 1997049646 | 12/1997 |
| WO | 1999036368 | 7/1999 |
| WO | 199947765 | 9/1999 |
| WO | 199960042 | 11/1999 |
| WO | 199960043 | 11/1999 |
| WO | 200058085 | 10/2000 |
| WO | 2001014491 | 3/2001 |
| WO | 2001059026 | 8/2001 |
| WO | 200200429 | 1/2002 |
| WO | 2003029496 | 4/2003 |
| WO | 2003071879 | 9/2003 |
| WO | 2003106561 | 12/2003 |
| WO | 2004076734 | 9/2004 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 | 5/2007 |
| WO | 2007112335 | 10/2007 |
| WO | 2008089847 | 7/2008 |
| WO | 2008089851 | 7/2008 |
| WO | 2008141201 | 11/2008 |
| WO | 2009019235 | 2/2009 |
| WO | 2010139899 | 12/2010 |
| WO | 2011019590 | 2/2011 |
| WO | 2011019593 | 2/2011 |
| WO | 2011019597 | 2/2011 |
| WO | 2011019598 | 2/2011 |
| WO | 2011022224 | 2/2011 |
| WO | 2011022226 | 2/2011 |
| WO | 2011022227 | 2/2011 |
| WO | 2011138458 | 11/2011 |
| WO | 2011138459 | 11/2011 |
| WO | 2013150123 | 10/2013 |

OTHER PUBLICATIONS

International Search Report and Written Opinion for PCT/US2008/069046, completed Sep. 25, 2008.

International Search Report for PCT/EP2008/060185, completed Oct. 23, 2008.

International Search Report for PCT/EP2012/058322, completed Oct. 8, 2012.

Written Opinion of the ISA for PCT/EP2012/058322, completed Oct. 8, 2012.

International Search Report for PCT/EP2011/057363, completed Sep. 5, 2011.

Ames, J.M., "The Maillard Browning Reaction—an Update," Chemistry & Industry, No. 17, 1988, 4 pages.

"Gamma-aminopropyltrimethoxysilane," Hawley's Condensed Chemical Dictionary, 14th Edition, John Wiley & Sons, Inc., 2002, 1 page.

(56) References Cited

OTHER PUBLICATIONS

Hodge, J.E., Chemistry of Browning Reactions in Model Systems, 1953, J. Agric. Food Chem., vol. 1, No. 15, pp. 928-943.
Agyei-Aye et al., "The Role of Anion in the Reaction of Reducing Sugars with Ammonium Salts," Carbohydrate Research 2002, 337: 2273-2277.
Laroque et al., "Kinetic study on the Maillard reaction. Consideration of sugar reactivity," Food Chemistry 2008, 111: 1032-1042.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.suga-lik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 2012, 22 pages.
Decision re Opposition to AU 2006272595, issued from Australian Patent Office, Aug. 14, 2015, 25 pages.
Opposition to EP 1732968, Notice of Opposition: Prior Art, Scope of the Patent, Reasons for the Opposition, issued from European Patent Office, Mar. 8, 2012, 18 pages.
Decision re Opposition to EP 1732968, issued from the European Patent Office, Nov. 14, 2014, 5 pages.
Opposition to EA 019802, submitted to Eurasian Patent Office on Dec. 26, 2014, 36 pages.
Decision re Opposition to EA 019802, issued by Eurasian Patent Office on Aug. 18, 2015, 15 pages.
Owens Corning Retiree Update: What Goes Around, Comes Around: A tale of Natural Binders, revised Mar. 20, 2013 p. 4.
A.P. Bryant, "The Terminology of Sugars," Industrial and Engineering Chemistry, vol. 26, No. 2, p. 231, Feb. 1934.
Food Flavor Chemistry, p. 162, Mar. 21, 2009 (English Abstract).
Office action for co-pending U.S. Appl. No. 12/524,502 (9 pages)—dated Sep. 21, 2012.
Office action for co-pending U.S. Appl. No. 12/524,502 (9 pages)—dated Apr. 4, 2013.
Office action for co-pending U.S. Appl. No. 12/524,512 (7 pages)—dated Aug. 6, 2012.
Office action for co-pending U.S. Appl. No. 12/524,512 (9 pages)—dated Apr. 1, 2013.
Office action for co-pending U.S. Appl. No. 12/524,512 (14 pages)—dated Nov. 12, 2014.
Office action for co-pending U.S. Appl. No. 12/524,512 (9 pages)—dated Jul. 10, 2015.
Office action for co-pending U.S. Appl. No. 12/524,512 (10 pages)—Mar. 23, 2016.
Office action for co-pending U.S. Appl. No. 12/524,512 (13 pages)—dated Oct. 5, 2016.
Office action for co-pending U.S. Appl. No. 12/524,512 (13 pages)—dated Apr. 6, 2018.
Office action for co-pending U.S. Appl. No. 12/524,512 (15 pages)—dated Jan. 17, 2019.
Office action for co-pending U.S. Appl. No. 14/116,048 (10 pages)—dated Jun. 23, 2017.
Office action for co-pending U.S. Appl. No. 12/524,469 (7 pages)—dated Jun. 7, 2012.
Office action for co-pending U.S. Appl. No. 12/524,469 (8 pages)—dated Jan. 29, 2013.
Office action for co-pending U.S. Appl. No. 12/524,469 (7 pages)—dated Aug. 20, 2013.
Office action for co-pending U.S. Appl. No. 12/524,469 (9 pages)—dated Jun. 9, 2014.
Office action for co-pending U.S. Appl. No. 12/524,469 (9 pages)—dated Oct. 17, 2014.
Office action for co-pending U.S. Appl. No. 12/524,469 (9 pages)—dated Jul. 23, 2015.
Office action for co-pending U.S. Appl. No. 12/524,539 (13 pages)—dated Jun. 21, 2012.
Office action for co-pending U.S. Appl. No. 12/524,539 (13 pages)—dated Jun. 6, 2013.
Office action for co-pending U.S. Appl. No. 12/524,539 (12 pages)—dated Dec. 17, 2014.
Office action for co-pending U.S. Appl. No. 12/524,539 (7 pages)—dated Jul. 15, 2015.
Office action for co-pending U.S. Appl. No. 12/524,539 (7 pages)—dated Mar. 23, 2016.
Office action for co-pending U.S. Appl. No. 12/524,539 (7 pages)—dated Dec. 29, 2016.
Office action for co-pending U.S. Appl. No. 12/524,522 (4 pages)—dated Oct. 11, 2011.
Office action for co-pending U.S. Appl. No. 12/667,718 (5 pages)—dated Sep. 3, 2013.
Office action for co-pending U.S. Appl. No. 12/667,718 (6 pages)—dated Sep. 9, 2014.
Office action for co-pending U.S. Appl. No. 12/671,922 (10 pages)—dated Oct. 7, 2011.
Office action for co-pending U.S. Appl. No. 12/671,922 (10 pages)—dated May 10, 2012.
Office action for co-pending U.S. Appl. No. 12/671,922 (9 pages)—dated Sep. 23, 2014.
Office action for co-pending U.S. Appl. No. 12/671,922 (5 pages)—dated Apr. 4, 2016.
Office action for co-pending U.S. Appl. No. 13/388,408 (5 pages)—dated Aug. 15, 2013.
Office action for co-pending U.S. Appl. No. 13/371,829 (9 pages)—dated Dec. 20, 2012.
Office action for co-pending U.S. Appl. No. 13/371,829 (6 pages)—dated Jul. 12, 2013.
Office action for co-pending U.S. Appl. No. 13/371,829 (6 pages)—dated Aug. 12, 2014.
Office action for co-pending U.S. Appl. No. 13/637,794 (8 pages)—dated Aug. 12, 2013.
Office action for co-pending U.S. Appl. No. 13/637,794 (9 pages)—dated Mar. 26, 2014.
Office action for co-pending U.S. Appl. No. 13/696,439 (11 pages)—dated Jan. 8, 2014.
Office action for co-pending U.S. Appl. No. 13/696,452 (7 pages)—dated Jan. 13, 2015.
Office action for co-pending U.S. Appl. No. 13/696,452 (9 pages)—dated Oct. 27, 2015.
Office action for co-pending U.S. Appl. No. 13/702,144 (6 pages)—dated Jan. 10, 2014.
Office action for co-pending U.S. Appl. No. 13/702,144 (7 pages)—dated Jul. 29, 2014.
Office action for co-pending U.S. Appl. No. 13/823,818 (9 pages)—dated Mar. 26, 2015.
Office action for co-pending U.S. Appl. No. 13/866,368 (16 pages)—dated Aug. 29, 2013.
Office action for co-pending U.S. Appl. No. 13/866,368 (11 pages)—dated Apr. 16, 2014.
Office action for co-pending U.S. Appl. No. 13/866,368 (8 pages)—dated Aug. 21, 2014.
Office action for co-pending U.S. Appl. No. 13/866,419 (14 pages)—dated Sep. 20, 2013.
Office action for co-pending U.S. Appl. No. 13/866,419 (10 pages)—dated Apr. 25, 2014.
Office action for co-pending U.S. Appl. No. 13/866,419 (8 pages)—dated Oct. 9, 2014.
Office action for co-pending U.S. Appl. No. 13/866,419 (8 pages)—dated Sep. 25, 2015.
Office action for co-pending U.S. Appl. No. 13/868,233 (23 pages)—dated Aug. 13, 2013.
Office action for co-pending U.S. Appl. No. 13/868,233 (12 pages)—dated Apr. 15, 2014.
Office action for co-pending U.S. Appl. No. 13/868,233 (8 pages)—dated Oct. 7, 2014.
Office action for co-pending U.S. Appl. No. 13/868,233 (8 pages)—dated Jul. 16, 2015.

(56) References Cited

OTHER PUBLICATIONS

Office action for co-pending U.S. Appl. No. 13/868,238 (8 pages)—dated Jul. 16, 2014.
Office action for co-pending U.S. Appl. No. 12/976,379 (7 pages)—dated Jan. 10, 2012.
Office action for co-pending U.S. Appl. No. 12/976,379 (6 pages)—dated Jul. 27, 2012.
Office action for co-pending U.S. Appl. No. 12/976,379 (9 pages)—dated Mar. 7, 2013.
Office action for co-pending U.S. Appl. No. 12/976,379 (8 pages)—dated Aug. 20, 2013.
Office action for co-pending U.S. Appl. No. 12/599,858 (8 pages)—dated May 11, 2011.
Office action for co-pending U.S. Appl. No. 13/341,542 (8 pages)—dated Dec. 26, 2012.
Office action for co-pending U.S. Appl. No. 13/341,542 (7 pages)—dated Feb. 10, 2014.
Office action for co-pending U.S. Appl. No. 14/026,394 (6 pages)—dated Aug. 14, 2014.
Office action for co-pending U.S. Appl. No. 14/272,556 (14 pages)—dated Nov. 20, 2014.
Office action for co-pending U.S. Appl. No. 14/272,556 (12 pages)—dated Sep. 17, 2015.
Office action for co-pending U.S. Appl. No. 14/342,069 (17 pages)—dated Dec. 29, 2015.
Office action for co-pending U.S. Appl. No. 14/342,069 (22 pages)—dated Sep. 2, 2016.
Office action for co-pending U.S. Appl. No. 14/342,069 (21 pages)—dated Sep. 26, 2017.
Office action for co-pending U.S. Appl. No. 14/342,069 (21 pages)—dated Jun. 6, 2018.
Office action for co-pending U.S. Appl. No. 14/649,277 (9 pages)—dated Jul. 22, 2016.
Office action for co-pending U.S. Appl. No. 14/686,915 (8 pages)—dated Nov. 18, 2016.
Office action for co-pending U.S. Appl. No. 14/810,765 (7 pages)—dated Jan. 29, 2016.
Office action for co-pending U.S. Appl. No. 14/828,916 (8 pages)—dated Nov. 25, 2016.
Office action for co-pending U.S. Appl. No. 14/867,502 (9 pages)—dated Nov. 18, 2016.
Office action for co-pending U.S. Appl. No. 15/172,432 (16 pages)—dated Apr. 17, 2017.
Office action for co-pending U.S. Appl. No. 15/702,087 (5 pages)—dated Nov. 9, 2018.
Office action for co-pending U.S. Appl. No. 15/177,442 (17 pages)—dated May 19, 2017.
Office action for co-pending U.S. Appl. No. 15/378,159 (18 pages)—dated Mar. 2, 2017.
Office action for co-pending U.S. Appl. No. 15/222,122 (8 pages)—dated Nov. 20, 2017.
Office action for co-pending U.S. Appl. No. 15/310,837 (13 pages)—dated Jun. 21, 2018.
Office action for co-pending U.S. Appl. No. 15/411,972 (9 pages)—dated Mar. 28, 2017.
Office action for co-pending U.S. Appl. No. 15/411,972 (8 pages)—dated Nov. 29, 2017.
Office action for co-pending U.S. Appl. No. 15/411,972 (9 pages)—dated Jun. 14, 2018.
Office action for co-pending U.S. Appl. No. 15/116,254 (8 pages)—dated Apr. 26, 2018.
Office action for co-pending U.S. Appl. No. 15/116,254 (10 pages)—dated Aug. 15, 2018.
Other Information—Narrative of verbal disclosure of Brian Swift (1 page)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).
1st Petition for Inter Partes Review of U.S. Pat. No. D. 631,670 (68 pages, filed Jun. 19, 2015 by Petitioners Johns Manville Corporation and Johns Manville, Inc.).
2nd Petition for Inter Partes Review of U.S. Pat. No. D. 631,670 (62 pages, filed Nov. 2, 2015 by Petitioners Johns Manville Corporation and Johns Manville, Inc.).
Decision of PTAB regarding Institution of Inter Partes Review for U.S. Pat. No. D. 631,670 (33 pages)—Jan. 12, 2016.
Decision2 of PTAB regarding Institution of Inter Partes Review for U.S. Pat. No. D. 631,670 (27 pages)—May 9, 2016.
Final Written Decision of PTAB regarding Inter Partes Review of U.S. Pat. No. D. 631,670 based on 1st Petition (56 pages)—Jan. 11, 2017.
Final Written Decision of PTAB regarding Inter Partes Review of U.S. Pat. No. D. 631,670 based on 2nd Petition (55 pages)—May 8, 2017.
Court of Appeals for Federal Circuit Judgment from Appeal of PTAB Decisions in Inter Partes Reviews of U.S. Pat. No. D. 631,670 (2 pages)—Jul. 13, 2018.
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. in connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
Declaration of Dr. Jonathan Vickers (10 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with $1^{st}$ Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. in connection with $2^{nd}$ Petition for Inter Partes Review of U.S. Pat. No. 9,039,827).
3rd Petition for Inter Partes Review of U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with $3^{rd}$ Petition for Inter Partes Review of U.S. Pat. No. 9,039,827).
Declaration of Dr. Elam Leed (11 pages, filed Jul. 29, Aug. 5, and Aug. 7, 2015 by Petitioners Johns Manville Corporation and Johns

(56) References Cited

OTHER PUBLICATIONS

Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Petition for Inter Partes Review of U.S. Pat. No. 9,469,747 (67 pages, filed Mar. 20, 2018 by Petitioners Johns Manville Corporation and Johns Manville, Inc.).
Petition for Inter Partes Review of U.S. Pat. No. 9,828,287 (86 pages, filed Mar. 23, 2018 by Petitioners Johns Manville Corporation and Johns Manville, Inc.).
Petition for Inter Partes Review of U.S. Pat. No. 9,464,207 (78 pages, filed Mar. 28, 2018 by Petitioners Johns Manville Corporation and Johns Manville, Inc.).
Petition for Inter Partes Review of U.S. Pat. No. 9,926,464 (74 pages, filed Mar. 30, 2018 by Petitioners Johns Manville Corporation and Johns Manville, Inc.).
Final Rejection in Ex Parte Reexamination of U.S. Pat. No. 7,888,445 (20 pages)—dated Jul. 24, 2015.
Final Rejection in Ex Parte Reexamination of U.S. Pat. No. 7,772,347 (23 pages)—dated Jul. 24, 2015.
Final Rejection in Ex Parte Reexamination of U.S. Pat. No. 7,854,980 (31 pages)—dated Aug. 18, 2015.
Advisory Action in Ex Parte Reexamination of U.S. Pat. No. 7,888,445 (4 pages)—dated Oct. 6, 2015.
Advisory Action in Ex Parte Reexamination of U.S. Pat. No. 7,772,347 (4 pages)—dated Oct. 6, 2015.
Advisory Action in Ex Parte Reexamination of U.S. Pat. No. 7,854,980 (4 pages)—dated Nov. 18, 2015.
Examiner's Answer in Ex Parte Reexamination of U.S. Pat. No. 7,888,445 (8 pages)—dated Mar. 23, 2016.
Examiner's Answer in Ex Parte Reexamination of U.S. Pat. No. 7,772,347 (8 pages)—dated Mar. 23, 2016.
Examiner's Answer in Ex Parte Reexamination of U.S. Pat. No. 7,854,980 (8 pages)—dated Mar. 22, 2016
Decision of PTAB in Ex Parte Reexamination of U.S. Pat. No. 7,888,445 (17 pages)—Sep. 29, 2016.
Decision of PTAB in Ex Parte Reexamination of U.S. Pat. No. 7,772,347 (18 pages)—Sep. 29, 2016.
Decision of PTAB in Ex Parte Reexamination of U.S. Pat. No. 7,854,980 (22 pages)—Sep. 30, 2016.
Court of Appeals for Federal Circuit Judgment from Consolidated Appeal of PTAB Decisions in Ex Parte Reexamination of U.S. Pat. No. 7,888,445, U.S. Pat. No. 7,772,347 and U.S. Pat. No. 7,854,980 (5 pages)—Mar. 9, 2018.
Notice of Intent to Issue Ex Parte Reexamination Certificate for U.S. Pat. No. 7,772,347 (4 pages)—Oct. 24, 2018.
Notice of Intent to Issue Ex Parte Reexamination Certificate for U.S. Pat. No. 7,888,445 (4 pages)—Dec. 7, 2018.
Decision of USPTO to Reopen Prosecution in Ex Parte Reexamination of U.S. Pat. No. 7,854,980 (7 pages)—Jan. 7, 2019.
Non-final Office Action from Reopened Prosecution in Ex Parte Reexamination of U.S. Pat. No. 7,854,980 (26 pages)—dated Apr. 3, 2019.
Final Office Action from Reopened Prosecution in Ex Parte Reexamination of U.S. Pat. No. 7,854,980 (11 pages)—dated Aug. 8, 2019.
Notice of Intent to Issue Inter Partes Reexamination Certificate for U.S. Pat. No. 7,807,771 (4 pages)—dated Jan. 30, 2014.
Notice of Intent to Issue Inter Partes Reexamination Certificate for U.S. Pat. No. 7,854,980 (6 pages)—Aug. 31, 2017.
Decision of PTAB in Inter Partes Reexamination of U.S. Pat. No. 7,888,445 (34 pages)—May 1, 2015.
Decision of PTAB in Inter Partes Reexamination of U.S. Pat. No. 7,772,347 (36 pages)—May 1, 2015.
Decision of PTAB in Inter Partes Reexamination of U.S. Pat. No. 7,854,980 (25 pages)—Jul. 30, 2015.
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9 , 2015.
Examiner's Determination on Patent Owner Response/Requester Comments after Board Decision in Inter Partes Reexamination of U.S. Pat. No. 7,888,445 (22 pages)—Oct. 17, 2016.
Examiner's Determination on Patent Owner Response/Requester Comments after Board Decision in Inter Partes Reexamination of U.S. Pat. No. 7,772,347 (17 pages)—Oct. 17, 2016.
Court of Appeals for Federal Circuit Opinion/Judgment from Appeal of PTAB Decision in Inter Partes Reexamination of U.S. Pat. No. 7,854,980 (13 pages)—Feb. 27, 2017.
Final Decision of PTAB in Inter Partes Reexamination of U.S. Pat. No. 7,888,445 (25 pages)—Sep. 8, 2017.
Final Decision of PTAB in Inter Partes Reexamination of U.S. Pat. No. 7,772,347 (24 pages)—Sep. 8, 2017.
Decision of PTAB re Request for Rehearing in Inter Partes Reexamination of U.S. Pat. No. 7,888,445 (7 pages)—Feb. 12, 2018.
Decision of PTAB re Request for Rehearing in Inter Partes Reexamination of U.S. Pat. No. 7,772,347 (7 pages)—Feb. 12, 2018.
Court of Appeals for Federal Circuit Decision re Consolidated Appeal of PTAB Decision in Inter Partes Reexamination of U.S. Pat. No. 7,772,347 and U.S. Pat. No. 7,888,445 (14 pages)—Oct. 15, 2019.
Decision of PTAB regarding Institution of Inter Partes Review for U.S. Pat. No. 8,114,210 (20 pages)—Oct. 21, 2015.
Final Written Decision of PTAB regarding Inter Partes Review of U.S. Pat. No. 8,114,210 (39 pages)—Oct. 19, 2016.
Court of Appeals for Federal Circuit Judgment from Appeal of PTAB Decision in Inter Partes Review of U.S. Pat. No. 8,114,210 (5 pages)—Jan. 16, 2018.
Decision1 of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB denying Institution of Inter Partes Review for U.S. Pat. No. 9,926,464 (29 pages)—Oct. 2, 2018.
Decision of PTAB denying Institution of Inter Partes Review for U.S. Pat. No. 9,464,207 (28 pages)—Oct. 2, 2018.
Decision of PTAB denying Institution of Inter Partes Review for U.S. Pat. No. 9,469,747 (29 pages)—Oct. 3, 2018.
Decision of PTAB denying Institution of Inter Partes Review for U.S. Pat. No. 9,828,287 (22 pages)—Oct. 16, 2018.
Statement of Revocation Grounds re GB2496951—Claimant Rockwool International (May 21, 2018, 22 pages).
Statement of Revocation Grounds re GB2451719—Claimant Rockwool International (May 18, 2018, 22 pages).
Expert Report re Revocation of GB2451719 and GB2496951—Claimant Rockwool International (Nov. 12, 2018, 11 pages).
United Kingdom Intellectual Property Office, Decision in *Rockwool International* v. *Knauf Insulation Limited,* Application under Section 72 for revocation of patents GB2451719 and GB2496951 (May 28, 2019—18 pages).
Decision of EPO Board of Appeal re Added Matter vis-à-vis EP06788492.4 (Jul. 17, 2019—14 pages).
U.S. Pat. No. 2,965,504.
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).
Notice of Intent to Issue Ex Parte Reexamination Certificate for U.S. Pat. No. 7,854,980 (3 pages)—Oct. 29, 2019.
Remand Order of PTAB in Inter Partes Reexamination of U.S. Pat. No. 7,888,445 (3 pages)—Jul. 1, 2020.

(56) References Cited

OTHER PUBLICATIONS

Remand Order of PTAB in Inter Partes Reexamination of U.S. Pat. No. 7,772,347 (3 pages)—Jul. 1, 2020.

* cited by examiner

LIQUID HIGH SOLIDS BINDER COMPOSITION

CROSS-REFERENCE TO RELATED APPLICATIONS

This application is a continuation of U.S. application Ser. No. 14/116,048, filed Jan. 31, 2014, which is a U.S. national counterpart application of International Application Serial No. PCT/EP2012/058322, filed May 6, 2012 under 35 U.S.C. § 371, which claims priority to International Application Serial No. PCT/EP2011/057363, filed May 7, 2011, and U.S. provisional application 61/556,458, filed Nov. 7, 2011, the entire disclosures of each of which are hereby incorporated by reference herein.

TECHNICAL FIELD

The invention described herein pertains to formaldehyde free, thermosetting liquid high solids binder compositions having rapid cure times on thermal curing and slow cure times at ambient temperatures so that the uncured binder compositions and products which comprise the uncured binder compositions have improved shelf lives.

BACKGROUND AND SUMMARY OF THE INVENTION

In view of regulatory and ecological concerns, there has been development of and increasing utilization of binder compositions which are free of formaldehyde in the manufacture of a number of articles, for example, for the manufacture of insulation products in which the binder is disposed on a collection of mineral fibers, such as fiberglass, and cured to consolidate the collection of fibers, and for the manufacture of cellulosic products in which a variety of forms of cellulose are bound and cured to form wood board products, such as wood fiber boards. See, for example, WO 2007/014236 or U.S. Pat. No. 7,888,445. There is a need for binder compositions which have improved shelf lives, both prior to application and in an uncured, substantially dehydrated state after application to collections of fibers.

DETAILED DESCRIPTION

Figure 1:
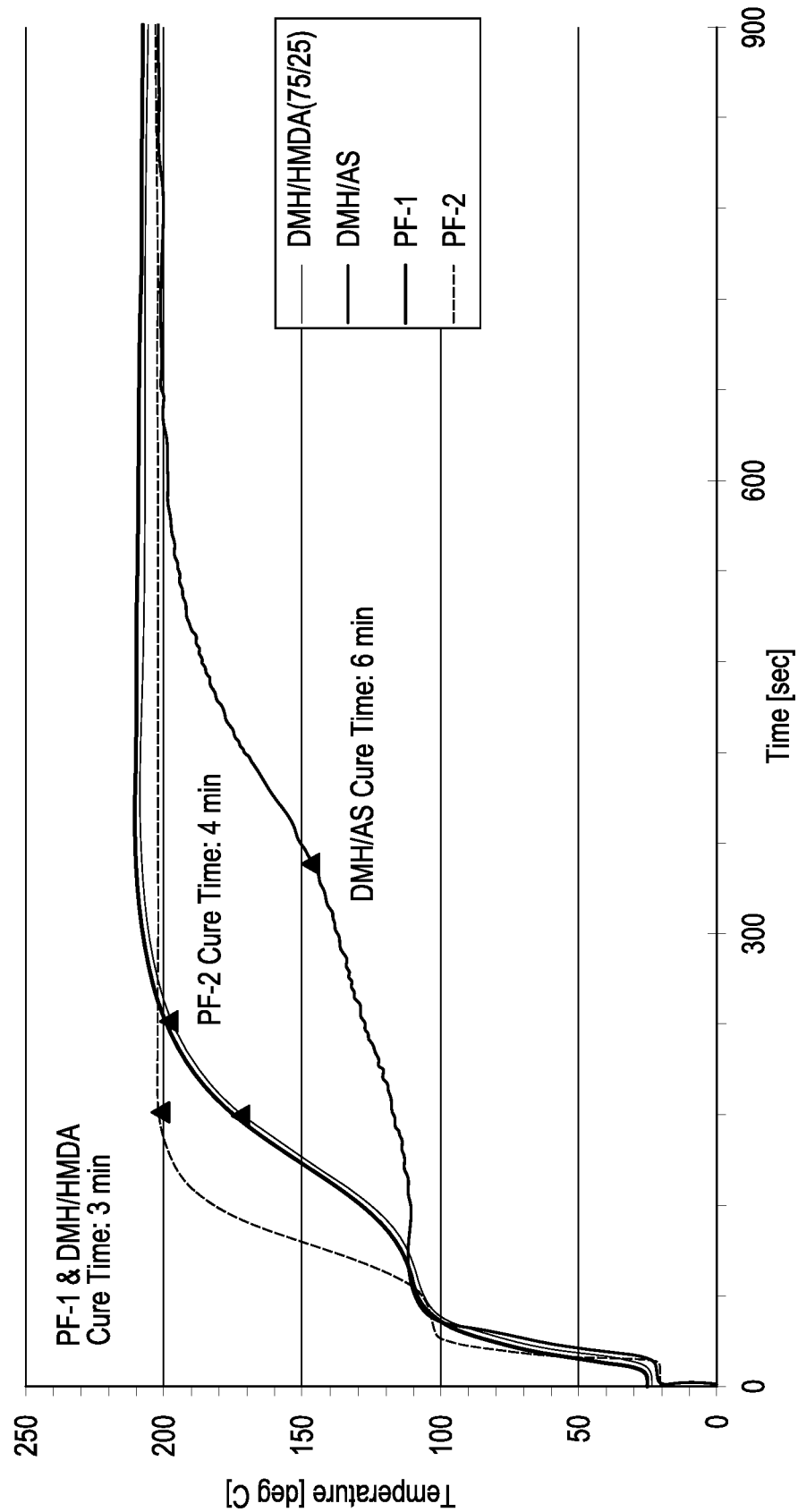
FIG. 1 (Comparison Examples) shows the cure times and the cure temperature profiles for binder compositions comprising dextrose monohydrate (DMH) with hexamethylenediamine (HMDA) and with ammonium sulfate (AS) and for typical phenol-formaldehyde (PF) binder compositions (PF-1 and PF-2).

In one embodiment, there is provided a liquid, curable, thermosetting, aqueous formaldehyde free, binder composition which is free of solid particles comprising a primary or secondary polyetheramine and a carbohydrate. As used herein, "aqueous" is not restricted to water as a solvent, but also includes a water-containing solvent. The liquid binder composition may be in the form of a dispersion, such as an emulsion or a suspension.

Because the binder composition does not utilize formaldehyde as a reagent, it is referred to as a formaldehyde-free binder. In one embodiment, the binder composition is one which liberates less than 5 ppm formaldehyde as a result of drying and/or curing (or appropriate tests simulating drying and/or curing). In another embodiment, the binder composition is one wherein the binder composition liberates less than 1 ppm formaldehyde under such conditions.

Embodiments of products incorporating the binder of the invention as described herein, for example insulation products or wood board products, may be "formaldehyde free" wherein they comprise less than 5 ppm or less than detectible limits of free formaldehyde and/or consist of materials which together comprise less than these amounts of free formaldehyde and/or release levels of formaldehyde in standardized tests adapted to simulate their ordinary use which allows them to be classified as having no or undetectable levels of formaldehyde release. In one embodiment, such products release less than 5 µg/m$^3$ of formaldehyde during the period of 24-48 hours from the start of testing in accordance with free of solid particles ISO 16000.

As used herein, "free of solid particles" means free of solid particles sufficiently large to block the nozzles of spraying equipment or to separate (settle out) from the liquid binder composition, but does not exclude, for example, microscopic particles or nanoparticles. In one embodiment, the binder composition is a solution.

As used herein, polyamines with oxygen in their chains are referred to as "polyetheramines" (also known as polyetherpolyamines) and include polyaminoalkylether compounds containing two or more amino groups (functionality of ≥2) and one or more ether linkages. The underlying ethers are derived from various polyols and ethyleneoxide, propylene oxide, trimethylene oxide, tetrahydrofuran, 1,4-dioxane and the like, or combinations thereof.

Polyetheramines are commercially available, for example, from BASF Group and from Huntsman Corporation (under trade names such as JEFFAMINE™ polyetheramine and ELASTAMINE™ polyetheramine). One embodiment of the binder composition as described herein is one wherein the approximate molecular weight of the polyetheramine does not exceed about 1000 or does not exceed 1000. One embodiment of the binder composition as described herein is one wherein the polyetheramine comprises a primary amine. One embodiment of the binder composition as described herein is one wherein the polyetheramine has an amine hydrogen equivalent weight (AHEW) of less than about 200 g/eq or less than 200 g/eq. One embodiment of the binder composition as described herein is one wherein the polyetheramine has an amine hydrogen equivalent weight (AHEW) of less than about 125 g/eq or less than 125 g/eq. One embodiment of the binder composition as described herein is one wherein the polyetheramine has an amine hydrogen equivalent weight (AHEW) of less than about 85 g/eq or less than 85 g/eq. One embodiment of the binder composition as described herein is one wherein the polyetheramine has an amine hydrogen equivalent weight (AHEW) of less than about 60 g/eq or less than 60 g/eq.

One embodiment of the binder composition as described herein is one wherein the polyetheramine comprises a primary triamine. One embodiment of a primary triamine is one wherein the polyetheramine has the structural formula of JEFFAMINE™ polyetheramine T-403.

JEFFAMINE™ polyetheramine T-403 amine is a trifunctional primary amine having an average molecular weight of 440. Its amine groups are located on secondary carbon atoms at the ends of aliphatic polyether chains. Its structure may be represented as follows, in which the sum of x, y, and z is 6:

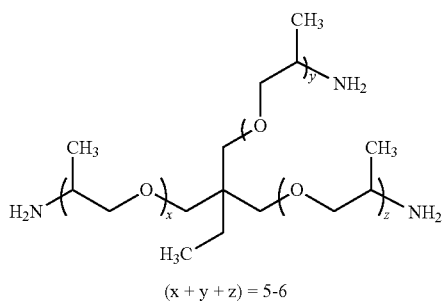

(x + y + z) = 5-6

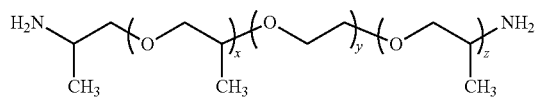

| JEFFAMINE® | y | x + z | MW* |
|---|---|---|---|
| HK-511 | 2.0 | ~1.2 | 220 |
| ED-600 (XTJ-500) | ~9.0 | ~3.6 | 600 |

JEFFAMINE™ polyetheramine XTJ-542 is a triblock polymer diamine of approximately 1000 molecular weight, based on a PTMEG [poly(tetramethylene ether glycol)]/PPG (polypropylene glycol) copolymer, and its structure may be represented as follows:

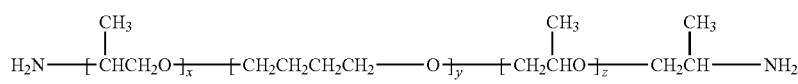

One embodiment of the binder composition as described herein is one wherein the polyetheramine comprises a primary diamine. One embodiment of a primary diamine is one wherein the polyetheramine has the structural formula of JEFFAMINE™ polyetheramine EDR-148, EDR-176, D-230, D-400, HK-511, ED-600 or XTJ-542.

JEFFAMINE™ polyetheramine EDR-148 and EDR-176 are primary diamines based on ethylene glycol as the central polyol, and their structures and molecular weights may be represented as follows:

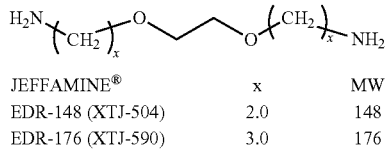

| JEFFAMINE® | x | MW |
|---|---|---|
| EDR-148 (XTJ-504) | 2.0 | 148 |
| EDR-176 (XTJ-590) | 3.0 | 176 |

The structures and average molecular weights (MW*) of the primary diamines JEFFAMINE™ polyetheramine D-230 and D-400 may be represented as follows:

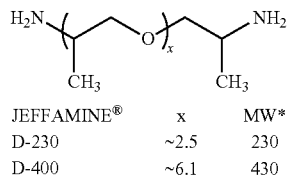

| JEFFAMINE® | x | MW* |
|---|---|---|
| D-230 | ~2.5 | 230 |
| D-400 | ~6.1 | 430 |

JEFFAMINE™ polyetheramine HK-511 and ED-600 are primary diamines based on a polyethylene glycol as the central polyol, and their structures and average molecular weights (MW*) may be represented as follows:

in which x is approximately 3, y is approximately 9 and z is approximately 2.

One embodiment of a primary diamine is one wherein the polyetheramine has the structural formula of JEFFAMINE™ polyetheramine EDR-104. JEFFAMINE™ polyetheramine EDR-104 has the following structural formula:

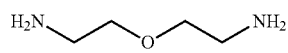

For any of the preceding embodiments of the binder composition, in one embodiment the carbohydrate comprises a reducing or non-reducing carbohydrate or a combination thereof. In one embodiment, the carbohydrate is a hydrolysate of sugars, starches, cellulose, or lignocellulosic material. In one embodiment the feedstock for the carbohydrate is molasses, bagasse, or corn cobs. For any of the preceding, in one embodiment the carbohydrate comprises a monosaccharide or a disaccharide or a combination thereof. For any of the preceding, in one embodiment the carbohydrate comprises one or more monosaccharides. For the preceding, in one embodiment the carbohydrate comprises dextrose, fructose or xylose, or a mixture thereof. For the preceding, in one embodiment the carbohydrate comprises a mixture of dextrose and fructose. For the preceding, in one embodiment the dextrose to fructose ratio is about 80:20 to about 20:80 or is 80:20 to 20:80.

For any of the preceding embodiments of the binder composition, in one embodiment the ratio of carbohydrate carbonyl-group to polyetheramine amino-group is in the range of about 0.15:1 to about 6:1 or is in the range of 0.15:1 to 6:1. For any of the preceding embodiments of the binder composition, in one embodiment the ratio of carbohydrate carbonyl-group to polyetheramine amino-group is in the range of about 0.5:1 to about 2:1 or is in the range of 0.5:1 to 2:1. For any of the preceding embodiments of the binder composition, in one embodiment the ratio of carbohydrate carbonyl-group to polyetheramine amino-group is in the range of about 0.75:1 to about 1.33:1 or is in the range of 0.75:1 to 1.33:1.

For any of the preceding embodiments, one embodiment is a binder composition further comprising a silicon-containing compound. In one embodiment of the preceding, the silicon-containing compound is selected from the group consisting of gamma-aminopropyltriethoxysilane, gamma-glycidoxypropyltrimethoxysilane, aminoethylaminopropyl-trimethoxysilane, an aminofunctional oligomeric silane, and mixtures thereof. In one embodiment of the preceding, the silicon-containing compound is gamma-aminopropyltriethoxysilane.

For any of the preceding embodiments, one embodiment is a binder composition further comprising a corrosion inhibitor selected from the group consisting of dedusting oil, ammonium phosphates, sodium metasilicate pentahydrate, melamine, tin (II)oxalate, and a methylhydrogen silicone fluid emulsion.

For any of the preceding embodiments of the binder composition, in one embodiment the binder concentration is at least about 35% solids or is at least 35% solids. For any of the preceding embodiments of the binder composition, in one embodiment the binder concentration is at least about 50% solids or is at least 50% solids. For any of the preceding embodiments of the binder composition, in one embodiment the binder concentration is at least about 70% solids or is at least 70% solids. For any of the preceding embodiments of the binder composition, in one embodiment the binder concentration is at least about 85% solids or is at least 85% solids. For any of the preceding embodiments of the binder composition, in one embodiment the binder concentration is at least about 90% solids or is at least 90% solids.

As used herein, "% solids" (corresponding to mass %) refers to the weight (mass) percentage of the dissolved binder constituents, based on the weight (mass) of the total aqueous binder composition.

For any of the preceding embodiments of the binder composition, in one embodiment the viscosity is less than about 5 Pa·s or is less than 5 Pa·s. For any of the preceding embodiments of the binder composition, in one embodiment the viscosity is less than about 2 Pa·s or is less than 2 Pa·s. For any of the preceding embodiments of the binder composition, in one embodiment the viscosity is less than about 1 Pa·s or is less than 1 Pa·s.

For any of the preceding embodiments of the binder composition, in one embodiment the increase in viscosity on standing for 1 week at a temperature not exceeding about 25° C. does not exceed 1 Pa·s. For any of the preceding embodiments of the binder composition, in one embodiment the increase in viscosity on standing for 2 weeks at a temperature not exceeding about 25° C. does not exceed 1 Pa·s. For any of the preceding embodiments of the binder composition, in one embodiment the increase in viscosity on standing for 3 weeks at a temperature not exceeding about 25° C. does not exceed 1 Pa·s. For any of the preceding embodiments of the binder composition, in one embodiment the increase in viscosity on standing for 4 weeks at a temperature not exceeding about 25° C. does not exceed 1 Pa·s.

For any of the preceding embodiments of the binder composition, in one embodiment the cure time for wet laid mats as described hereinbelow at 400° F. (204° C.) is no greater than about 7 min or is no greater than 7 min. For any of the preceding embodiments of the binder composition, in one embodiment the cure time for wet laid mats as described hereinbelow at 400° F. (204° C.) is no greater than about 5 min or is no greater than 5 min. For any of the preceding embodiments of the binder composition, in one embodiment the cure time for wet laid mats as described hereinbelow at 400° F. (204° C.) is no greater than about 4 min or is no greater than 4 min.

For any of the preceding embodiments of the binder composition, in one embodiment the composition is free or substantially free of an acid component. As used herein, acid component means an acid or the salt of an acid with ammonia or another amine. An acid may be an inorganic acid, such as for example sulfuric acid or phosphoric acid, a mono- or polycarboxylic acid, such as for example glycolic or citric acid, or an organic acid which is other than a carboxylic acid, such as a sulfonic acid or phosphonic acid, for example methanesulfonic acid or para-toluenesulfonic acid. A salt with ammonia is, for example, ammonium sulfate or ammonium phosphate. An amine other than ammonia may be a primary, secondary or tertiary amine.

For any of the preceding embodiments of the binder composition, in one embodiment the pH is at least about 11 or is at least 11. For any of the preceding embodiments of the binder composition, in one embodiment the pH is at least about 9 or is at least 9. For any of the preceding embodiments of the binder composition, in one embodiment the pH is at least about 7 or is at least 7.

For any of the preceding embodiments of the binder composition, in one embodiment the binder composition is a commercial/merchant market binder composition or binder composition concentrate.

For any of the preceding embodiments of the binder composition, in one embodiment the binder composition is an about 70% solids binder or a is a 70% solids binder having a viscosity of no more than about 1.5 Pa·s or of no more than 1.5 Pa·s.

For any of the preceding embodiments, one embodiment is a binder composition further comprising a non-aqueous moisturizer, for example as described in WO 2011/123593. In one embodiment of the preceding, the non-aqueous moisturizer comprises a polyoxyalkylene glycol or a polypropylene glycol.

In one embodiment, there is provided an uncured binder composition disposed on a collection of fibers as a viscous or semi-viscous high-solids mixture which functions as a binder to bind the fibers in the collection of fibers, wherein the uncured binder composition is a substantially dehydrated composition of the binder composition as described in any of the above embodiments of a liquid binder composition.

In one embodiment, there is provided a collection of fibers bound by an uncured aqueous curable binder composition in contact with the fibers, wherein the uncured binder composition is a substantially dehydrated composition of the binder composition as described in any of the above embodiments of a liquid binder composition. For the preceding, in one embodiment the fibers are mineral fibers, aramid fibers, ceramic fibers, metal fibers, carbon fibers, polyimide fibers, polyester fibers, rayon fibers, or cellulosic fibers. For the preceding, in one embodiment the fibers are mineral fibers. For the preceding, in one embodiment the mineral fibers are slag wool fibers, stone wool fibers, or glass fibers. In illustrative embodiments, the collection of matter includes insulating fibers. In one embodiment, a fiber insulation product is described which includes insulating fibers and a binder. As used herein, the term "insulating fiber," indicates heat-resistant fibers suitable for withstanding elevated temperatures. Examples of such fibers include, but are not limited to, mineral fibers (glass fibers, slag wool fibers, and stone wool fibers), aramid fibers, ceramic fibers, metal fibers, carbon fibers, polyimide fibers, certain polyester fibers, and rayon fibers. Illustratively, such fibers are substantially unaffected by exposure to temperatures above about 120° C. In one embodiment, the insulating fibers are glass fibers. In yet another embodiment, the mineral fibers are present in the range from about 70% to about 99% by weight.

In one embodiment, the above collection is an uncured glass fiber insulation blanket (wet blanket). In another embodiment, the above collection is an uncured glass fiber pipe insulation (pipe insulation uncured).

In one embodiment of the above collection of fibers bound by an uncured aqueous curable binder composition in contact with the fibers, the collection of matter comprises cellulosic fibers. For example, the cellulosic fibers may be wood shavings, sawdust, wood pulp, or ground wood. In yet another embodiment, the cellulosic fibers may be other natural fibers such as jute, flax, hemp, and straw. The binder disclosed herein may be used as in the place of the binder described in Published PCT application WO 2008/089847, which is incorporated herein by reference in its entirety. In one embodiment, a composite wood board comprising wood particles and a binder is disclosed. In another embodiment, the composite wood board is formaldehyde free. In one embodiment, the composite wood board has a nominal thickness range of greater than 6 mm to 13 mm, and has a modulus of elasticity (MOE) of at least about 1050 $N/mm^2$, a bending strength (MOR) of at least about 7 $N/mm^2$, and an internal bond strength (IB) of at least 0.20 $N/mm^2$. In another embodiment, the composite wood board has a nominal thickness range of greater than 6 mm to 13 mm, and has a bending strength (MOR) of at least about 12.5 $N/mm^2$, and an internal bond strength (IB) of at least 0.28 $N/mm^2$. In another embodiment, the composite wood board has a nominal thickness range of greater than 6 mm to 13 mm, and has a modulus of elasticity (MOE) of at least about 1800 $N/mm^2$, a bending strength (MOR) of at least about 13 $N/mm^2$, and an internal bond strength (IB) of at least 0.40 $N/mm^2$. In another embodiment, the composite wood board has a modulus of elasticity (MOE) of at least about 1800 $N/mm^2$. In another embodiment, the composite wood board has a modulus of elasticity (MOE) of at least about 2500 $N/mm^2$. In another embodiment, the composite wood board has a bending strength (MOR) of at least about 14 $N/mm^2$. In yet another embodiment, the composite wood board has a bending strength (MOR) is at least about 18 $N/mm^2$. In one embodiment, the composite wood board has an internal bond strength (IB) of at least about 0.28 $N/mm^2$. In yet another embodiment, the composite wood board has an internal bond strength (IB) is at least 0.4 $N/mm^2$. In yet another embodiment, the composite wood board swells less than or equal to about 12%, as measured by a change in thickness, after 24 hours in water at 20° C. In another embodiment, the composite wood board has a water absorption after 24 hours in water at 20° C. of less than or equal to about 40%.

In illustrative embodiments the composite wood board is a wood particleboard, an orientated strandboard, or a medium density fiberboard. In one embodiment, the binder comprises from about 8% to about 18% by weight (weight of dry resin to weight of dry wood particles) of the composite wood board. In another embodiment, the composite wood board further comprises a wax. In yet another embodiment, the composite wood board comprises from about 0.1% to about 2% wax by weight of the composite wood board. In illustrative embodiments, the method of making a collection of matter bound with a polymeric binder may further include preparing a solution by adding an amount of a carbohydrate reactant and an amount of a primary polyetheramine so a weight ratio is in the range of about 2:1 to about 10:1. In one embodiment, preparing the solution includes adding the carbohydrate reactant and the polyetheramine to an aqueous solution. In another embodiment, preparing the solution includes adjusting the pH of the solution to within the range of about 8 to about 12. In yet another embodiment, the method of making a collection of matter bound with a polymeric binder may further comprise packaging the uncured product in a packaging material suitable for storage.

As used herein, an uncured binder is a substantially dehydrated mixture of chemicals which can be cured to form a cured binder. Substantially dehydrated means that the solvent (typically water or a mixture thereof) used to make the binder solution is vaporized to the extent that the viscosity of the remaining material (comprising the binder reactants and solvent) is sufficiently high to create cohesion between the loosely assembled matter; thus, the remaining material is an uncured binder. In one embodiment, the solvent is less than 65% of the total weight of the remaining material. In another embodiment, a substantially dehydrated binder has a moisture content between about 5% and about 65% water by weight of total binder. In another embodiment, the solvent may be less than 50% of the total weight of the remaining material. In yet another embodiment, the solvent may be less than 35% of the total weight of the remaining material. In another embodiment, a substantially dehydrated binder has between about 10% and about 35% water by weight of total binder. In another embodiment, the solvent may comprise less than about 20% of the total weight of the remaining material.

In illustrative embodiments, an uncured binder may be colorless, white, off white, ochre or yellow to brownish sticky substance that is, at least partially, water soluble. As used herein, the term cured binder describes the polymeric product of curing the uncured binder composition. The cured binder may have a characteristic brown to black color. While described as brown or black, another characteristic is that the binder tends to absorb light over a broad range of wavelengths. In particular, there may be higher absorbance at approximately 420 nm. As the polymer is extensively cross-linked, the cured binder is substantially insoluble. For example, the binder is predominantly insoluble in water. As described herein, the uncured binder provides sufficient binding capacity to consolidate fibers; however, the cured binder imparts the robust, long-lasting durability and physical properties commonly associated with cross-linked polymers.

In one embodiment, there is provided a method of fabricating the collection described in of the above embodiments, wherein the uncured aqueous curable binder composition is placed in contact with the fibers in a step in which the aqueous binder is sprayed on the fibers or applied via a roll-coat or curtain coat apparatus. For the preceding, in one embodiment the aqueous binder is sprayed onto a mat of glass fibers during the production of a fiberglass insulation product. For the preceding, in one embodiment the residual heat from the production of the glass fibers and the flow of air through the fibrous mat evaporate water from the binder, leaving the remaining components of the binder on the fibers as a coating of viscous or semi-viscous high-solids liquid.

In illustrative embodiments, the binder reactants described herein are soluble in water and the binder solution is a solution of the binder reactants in an aqueous solution. In one embodiment, a surfactant is included in the aqueous solution to increase the solubility or dispersability of one or more binder reactants or additives, as well as to improve wetting and coating of the substrate with the binder composition. For example, a surfactant may be added to the aqueous binder solution to enhance the dispersibility of a particulate additive. In one embodiment, a surfactant is used to create an emulsion with a non-polar additive or binder reactant. In another embodiment, the binder solution comprises about 0.01% to about 5% surfactant by weight based on the weight of the binder solution.

In illustrative embodiments, the binder solutions described herein can be applied to mineral fibers (e.g., sprayed onto the mat or sprayed onto the fibers as they enter the forming region), during production of mineral fiber insulation products. Once the binder solution is in contact with the mineral fibers the residual heat from the mineral fibers (note that glass fibers for example are made from molten glass and thus contain residual heat) and the flow of air through and/or around the product will cause a portion of the water to evaporate from the binder solution. Removing the water leaves the remaining components of the binder on the fibers as a coating of viscous or semi-viscous high-solids mixture. This coating of viscous or semi-viscous high-solids mixture functions as a binder. At this point, the mat has not been cured. In other words, the uncured binder functions to bind the mineral fibers in the mat.

Furthermore, it should be understood that the above described uncured binders can be cured. For example, the process of manufacturing a cured insulation product may include a subsequent step in which heat is applied as to cause a chemical reaction in the uncured binder composition. For example, in the case of making fiberglass insulation products or other mineral fiber insulating products, after the binder solution has been applied to the fibers and dehydrated, the uncured insulation product may be transferred to a curing oven. In the curing oven the uncured insulation product is heated (e.g., from about 300° F. to about 600° F. [from about 150° C. to about 320° C.]), causing the binder to cure. The cured binder is a formaldehyde-free, water-resistant binder that binds the fibers of the insulation product together. Note that the drying and thermal curing may occur either sequentially, simultaneously, contemporaneously, or concurrently.

In illustrative embodiments, an uncured fiber product comprises about 2% to about 40% of dry binder solids (total uncured solids by weight). In one embodiment, the uncured fiber product comprises about 5% to about 25% of dry binder solids. In another embodiment, the uncured fiber product comprises about 50% to about 98% fibers by weight.

As mentioned herein with respect to a binder on mineral fibers, a cured binder is the product of curing binder reactants. The term cured indicates that the binder has been exposed to conditions so as to initiate a chemical change. Examples of these chemical changes include, but are not limited to, (i) covalent bonding, (ii) hydrogen bonding of binder components, and (iii) chemically cross-linking the polymers and/or oligomers in the binder. These changes may increase the binder's durability and solvent resistance as compared to the uncured binder. Curing a binder may result in the formation of a thermoset material. In addition, a cured binder may result in an increase in adhesion between the matter in a collection as compared to an uncured binder. Curing can be initiated by, for example, heat, microwave radiation, and/or conditions that initiate one or more of the chemical changes mentioned above. While not limited to a particular theory, curing may include the reaction of the carbohydrate and the polyetheramine to form melanoidins.

In a situation where the chemical change in the binder results in the release of water, e.g., polymerization and cross-linking, a cure can be determined by the amount of water released above that which would occur from drying alone. The techniques used to measure the amount of water released during drying as compared to when a binder is cured, are well known in the art.

In one embodiment, there is provided a composition comprising a collection of matter and a binder, the binder comprising polymeric products of a reaction between a polyetheramine and a carbohydrate of a binder composition as described in any of the above embodiments, the polymeric products being substantially water insoluble.

In one embodiment of the above composition, the collection of matter comprises fibers selected from the group consisting of mineral fibers, aramid fibers, ceramic fibers, metal fibers, carbon fibers, polyimide fibers, polyester fibers, rayon fibers, and cellulosic fibers. For the preceding, in one embodiment the collection of matter comprises glass fibers. In one embodiment the collection of matter is a batt, for example an insulation batt. In another embodiment the collection of matter is a sheet, for example a non-woven fiber sheet product known as a veil product.

In one embodiment of the above composition, the collection of matter comprises cellulosic fibers. For the preceding, in one embodiment the cellulosic fibers are present in a cellulosic substrate selected from the group consisting of wood shavings, sawdust, wood pulp, and ground wood.

In one embodiment, there is provided a method of fabricating a fiberglass or stone wool product, comprising spraying the aqueous binder composition as described in any of the above embodiments on a collection of glass or stone wool fibers; dehydrating the aqueous solution while disposed on the collection of glass or stone wool fibers to form an uncured fiberglass product; and subjecting the uncured fiberglass or stone wool product to sufficient heat to turn the fiberglass or stone wool product brown. In one embodiment the product is a batt, for example an insulation batt. In another embodiment the product is a sheet, for example a non-woven fiber sheet product known as a veil product.

In one embodiment of the above, there is provided a method of fabricating a fiberglass or stone wool product, comprising spraying the aqueous binder composition as described in any of the above embodiments on a collection of glass or stone wool fibers; dehydrating the aqueous solution while disposed on the collection of glass or stone wool fibers to form an uncured fiberglass or stone wool product; storing the uncured fiberglass or stone wool product, for example as a roll, and curing the uncured fiberglass or stone wool product by subjecting it to sufficient heat to turn the fiberglass or stone wool product brown. In one embodiment, the uncured product is molded into the shape of a final product prior to curing. For any of the above, in one embodiment, the uncured product is stored at or below about 90° F. (32° C.) prior to curing. In another embodiment, the uncured product is stored at or below about 70° F. (21° C.) prior to curing. In a further embodiment, the uncured product is stored at or below about 50° F. (10° C.) prior to curing.

One aspect of the present disclosure is that the cured binder composition comprises a nitrogenous polymer. The nitrogenous polymer is brown to black in color. While not limited to a particular theory, the cured binder composition comprises melanoidins. Melanoidins are identifiable as being brown, high molecular weight, complex, furan ring-containing and nitrogen-containing polymers. High molecular weight, as used herein, includes those polymers having a molecular weight in excess of 100,000 Daltons. Being comprised of highly cross-linked polymeric chains, the molecular weight of the melanoidins described herein approaches infinity. Accordingly, the molecular weight of a melanoidin may be a function of the mass and physical dimensions of the polymer being analyzed. For example, a unitary sample of melanoidins having a mass of 3 grams may be presumed to comprise a single polymeric molecule due to the extensive cross-linking. Accordingly, the molecular weight of the polymer would be approximately $1.8 \times 10^{24}$ grams per mole (being the product of the sample mass and Avogadro's number). As used herein, a high molecular weight polymer includes polymers with a molecular weight in the order of between about $1 \times 10^5$ and about $1 \times 10^{24}$ grams per mole.

While not be limited to a particular theory, it is known that melanoidins vary in structure according to the reactants and conditions of preparation. It is also known that melanoidins possess a carbon to nitrogen ratio which increases with temperature and time of heating. Furthermore, melanoidins possess saturated, unsaturated and aromatic character. For melanoidins, the degree of unsaturation and aromaticity increases with temperature (cure temperature) and time of heating (cure time). Melanoidins also contain the carbonyl carbon of those sugars incorporated as reactants in a variety of structures within the melanoidin. Melanoidins may also contain carbonyl, carboxyl, amine, amide, pyrrole, indole, azomethine, ester, anhydride, ether, methyl and/or hydroxyl groups. Depending on the complexity of the structure, infrared spectroscopy may be useful in the identification of one or more of these functional groups. While described as a melanoidin-type polymer herein, one of ordinary skill would appreciate that the binder may also be classifiable according to the existence of a particular bond present.

Another manner in which the binder is characterizable is through analysis of the gaseous compounds produced during pyrolysis of the cured binder. For example, gas pyrolysis of a cured binder within the scope of the present disclosure, such as fingerprinting in pyrolysis gas chromatography mass spectrometry (Py GC-MS) carried out at 770° C. of a binder sample prepared using a polyetheramine and a carbohydrate may yield one or more of the following compounds: 2-cyclopenten-1-one, 2,5-dimethyl-furan, furan, 3-methyl-2,5-furandione, phenol, 2,3-dimethyl-2-cyclopenten-1-one, 2-methyl phenol, 4-methyl phenol, 2,4-dimethyl-phenol, pyridine and a number of components which are pyrrole or pyridine derivatives (a methyl pyridine, a methyl pyrrole, dimethyl pyridines, a dimethyl pyrrole, an ethyl methyl pyrrole, and other pyrrole related N-containing components).

One aspect of the present disclosure is that the binders described herein are environmentally friendly. Parallel to advancing government regulation, the present disclosure describes a binder that may be made formaldehyde-free. Additionally, the chemistry described herein is essentially free of formaldehyde and phenol. In this sense, neither formaldehyde nor phenol is used as a reagent within the scope of the present disclosure. While both may be added to obtain a binder with potentially useful properties, one aspect of the present disclosure is a binder that can be made free from both of these reactants. In another aspect, the present binder composition may be manufactured without the use of volatile reactants. In one embodiment, the polyetheramine and the carbohydrate are both non-volatile reactants. As used herein, a volatile reactant is one that has a vapor pressure greater than 10 kPa at 20° C. Similarly, as used herein, a non-volatile reactant has a vapor pressure of less than about 10 kPa at 20° C. Specifically and as an example, the present binder may be manufactured without the addition of ammonia or an ammonia releasing compound. In one embodiment, the polyetheramine has a vapor pressure of less than about 0.5 kPa at 60° C.

Another environmentally friendly aspect of the present disclosure is that the primary reactants of the binder are carbohydrates. Carbohydrates are considered a renewable resource. However, the current state of the art primarily uses petroleum-derived reactants for the manufacture of binder compositions. In another aspect, the binder is made through chemical reactions which can occur at lower temperatures than those comparable systems described in the prior art. As such, the curing ovens and manufacturing equipment can be operated at lower temperatures, saving valuable resources. In the alternative and in a related manner, the binder described herein cures more quickly than comparable binders currently used when subjected to similar curing temperatures. Accordingly, through either approach, one aspect of the present disclosure is that the carbon footprint of a formed product using the presently disclosed binder may be substantially reduced compared to a comparable binder made according to the current state of the art, for example a phenol formaldehyde based product.

In addition to the environmental benefits, the present binder composition and materials made therewith can be made having performance characteristics equivalent or exceeding those of comparable binder systems, for example phenol formaldehyde binders. In one aspect, a binder according to the present disclosure provides articles made therewith sufficient tensile strength to allow for die-cutting, fabrication, lamination, and installation in OEM applications. In one aspect, a binder according to the present disclosure has water hold-up (weatherability) comparable to that of a phenol formaldehyde binder. Other performance characteristic that may be relevant for a particular application include product emissions, density, loss on ignition, thickness recovery, dust, tensile strength, parting strength, durability of parting strength, bond strength, water absorption, hot surface performance, corrosivity on steel, flexural rigidity, stiffness-rigidity, compressive resistance, conditioned compressive resistance, compressive modulus, conditioned compressive modulus, and smoke development on ignition. One aspect of the present disclosure is that the extract of the cured binder is essentially pH neutral, for example between a pH of 6 and 8. Another aspect of the present disclosure is that the present binder enables the manufacture of products having comparable relevant performance characteristics to phenol formaldehyde binder compositions.

Illustratively, in one embodiment, a binder according to the present disclosure invention has the advantage of yielding essentially colorless aqueous extracts. This feature of the present disclosure makes the binder desirable in applications such as ceiling tiles, furniture, or office panels, wherein the finished product may come into contact with water. A cured manufactured good made with the present binder shows an excellent resistance to discoloration or bleeding after coming in contact with moisture or water. Furthermore, in such an embodiment, the water that contacts the binder does not leave a residual color on other articles or parts which it may contact subsequent to contact the binder. For example, in one embodiment, the binder may be used to bind glass fibers in an office panel application. Covering the bound fiberglass composition may be a light colored fabric. Advantageously, in one embodiment, water contacting the fiberglass composition does not leave a colored residue upon the fabric after the office panel has dried.

In addition to the performance characteristics, the manufacturing processes and methods involving the presently disclosed binder have a number of unexpected advantages over previously described binders. In one aspect, as previously described with respect to the environmental benefits, the present binder may be manufactured without the use of highly volatile reactants. Accordingly, manufacturing emission controls are under a reduced burden. Furthermore, the reaction efficiency is higher because reactant loss due to vaporization is reduced. Accordingly, one aspect of the present disclosure is that the compounds used herein are substantially non-volatile, thus the steps one must take to mitigate undesirable emissions are reduced.

As noted above, according to another aspect, the reactants that react to form a binder are sufficiently slow to react at ambient temperatures such that a one step/one pot binder system can be used. According to this aspect, the reactant compounds are sufficiently slow to react that they can be added to a single reactant solution and stored for a reasonable amount of time during which they can be applied to a product using one distribution system. This contrasts with those binder systems which react at low temperatures resulting in insoluble reaction products within binder solution delivery systems. As used here, a reasonable amount of time for storage without substantial (>5%) polymeric precipitation is two weeks. three weeks or four weeks.

Another aspect of the present disclosure is a binder having a cure rate, cycle time, and cure temperature which meets or exceeds those cure rates that a comparable phenol and formaldehyde type binder may exhibit within the scope of a comparable use. In this respect, the present binder can be used as a direct replacement to phenol formaldehyde resins in applications without modification to the equipment. Furthermore, the present binder enables the modification of the curing temperature and times so that both the reaction temperatures and cure times may be reduced. This reduction has the effect of reducing the energy consumption of the process overall and reduces the environmental impact of manufacturing the product. Furthermore, the lower cure temperatures have the further effect of increasing the safety of manufacturing process. Another effect of the lower cure temperatures is a reduction in the risk of flameless combustion or fire.

In the manufacture of insulation products, the heat released by the exothermic curing reaction may result in self-heating of the product. Self-heating is typically not problematic so long as the heat dissipates from the product. However, if the heat increases the temperature of the product to the point where oxidative processes commence, the self-heating may cause significant damage to the product. For example, flameless combustion or oxidation may occur when the temperature of the insulation product exceeds about 425° F. (210° C.). At these temperatures, the exothermic combustion or oxidation processes promote further self-heating and the binder may be destroyed. Furthermore, the temperature may increase to a level in which fusing or devitrification of the glass fibers is possible. Not only does this damage the structure and value of the insulation product, it may also create a fire hazard. As disclosed in PCT/EP2011/059317, incorporated by reference herein, the temperature increase on curing may be controlled by incorporating a temperature control agent with an uncured binder and loosely associated fibers as described herein. Thus, for any of the embodiments of an uncured binder composition disposed on a collection of fibers as described herein, another embodiment further comprises a particulate selected from a group consisting of a phosphate, magnesia, alumina, and calcined gypsum, wherein the binder is disposed upon the collection of fibers and the particulate is distributed within the fiber product. In one embodiment, the particulate has a number weighted average particle size of less than about 200 micrometers, or the particulate has a number weighted average particle size of less than about 50 micrometers, or the particulate has a number weighted average particle size of less than about 20 micrometers. In one embodiment, the uncured fiber product comprises from about 0.25% to about 15% by weight of the particulate. For any of the above embodiments, there is provided an uncured fiber product comprising an uncured binder, a collection of fibers, and a temperature control additive, wherein the uncured binder is disposed upon the collection of fibers and the temperature control additive is a particulate in contact with the collection of fibers, in contact with the binder, or dispersed throughout the uncured fiber product. For the preceding, in one embodiment, the temperature control additive is selected from a group consisting of a phosphate, aluminum hydroxide, magnesium hydroxide, calcium silicate hydrates, and calcium sulfate dihydrate. In one embodiment, the uncured fiber product of any of the above descriptions comprises about 61% to about 96% fibers, about 1% to about 15% of the temperature control additive, and 3% to about 30% of the uncured binder.

Also, there is provided a method of curing a binder having a temperature control additive as described in any embodiment herein, comprising heating the uncured binder to a temperature within a predetermined temperature range, the temperature range being high enough to cure the binder but low enough so as to not burn the binder and maintaining the temperature within the predetermined temperature range for a time sufficient to substantially cure the binder, wherein maintaining the temperature includes the temperature control additive undergoing an endothermic process. In one embodiment of the above method, the predetermined temperature range is from about 100° C. to about 350° C., or is from about 170° C. to about 300° C. In one embodiment of the above method, the predetermined temperature range has as its lower boundary a temperature sufficient to initiate a curing reaction. In one embodiment of the above method, the predetermined temperature range has as its upper boundary a temperature at which the binder ignites. In one embodiment of the above method, the temperature control additive undergoes an endothermic process comprising a decomposition, a phase transition, or a dehydration. In one embodiment of the above method, the temperature control additive undergoes an endothermic process that consumes at least about 200 calories per gram of the particulate temperature control additive.

Further, there is provided a method of manufacturing an insulation product comprising contacting a collection of fibers with a binder as described in any of the embodiments herein to form an uncured insulation product, contacting the collection of fibers with a temperature control additive, shaping the uncured insulation product into a configuration adapted for an insulating purpose, applying an amount of energy to the uncured insulation product subsequent to contacting the collection of fibers with the temperature control additive, the amount of energy sufficient to initiate an exothermic process curing of the binder from an uncured state to a cured state, and maintaining the temperature of the binder within a predetermined range. Another embodiment of the method is one comprising forming a dispersion comprising the binder and the temperature control additive, wherein contacting the collection of fibers with the binder and contacting the collection of fibers with the temperature control additive occur concurrently through contacting the collection of fibers with the dispersion including the binder and the temperature control additive. Another embodiment is one wherein forming the dispersion includes adding a surfactant. A further embodiment comprises forming an aqueous dispersion of the temperature control additive and a surfactant, wherein contacting the collection of fibers with the temperature control additive occurs subsequently to contacting the collection of fibers with the binder. For the above method of manufacturing an insulation product, another embodiment is one wherein contacting the collection of fibers with the temperature control additive includes sprinkling the temperature control additive onto the uncured insulation product, the temperature control additive being in the form of a dry powder or concentrated slurry.

Also, there is provided a method of manufacturing an insulation product using the uncured binder of any of the embodiments described herein, with or without a temperature control agent, comprising shaping the uncured insulation product, wherein shaping the uncured insulation product comprises shaping the uncured insulation product into a configuration adapted for insulating walls or wherein shaping the uncured insulation product comprises shaping the uncured insulation product into a configuration adapted for insulating pipes.

Further, there is provided use of a particulate selected from the group consisting of a phosphate, aluminum hydroxide, magnesium hydroxide, calcium silicate hydrates, and calcium sulfate dihydrate as a temperature control additive in combination with an uncured binder as described in any of the embodiments herein in the manufacture of fibrous products. In one embodiment, the fibrous product is mineral wool insulation or fiberglass insulation.

Another aspect of the present disclosure is that the binder system is essentially non-corrosive with or without the addition of corrosion inhibitors. Furthermore, the binder system does not require the addition of any organic or inorganic acid or salts thereof as catalyst or active ingredient. Accordingly, one aspect of the present binder is that it may be made essentially acid-free. Furthermore, the binder may be manufactured under entirely alkaline conditions. As used here, the term acid includes those compounds which are characterizable primarily for their acidic character such multiprotic inorganic and organic acids (e.g. sulfuric acid and citric acid). This aspect reduces the wear and maintenance requirements of the manufacturing equipment and enhances worker safety.

In illustrative embodiments, a binder comprises a polymeric product of a carbohydrate reactant and a polyetheramine. As used herein, the term carbohydrate reactant refers to a monosaccharide, a disaccharide, a polysaccharide, or a reaction product thereof. In one embodiment, the carbohydrate reactant may be a reducing sugar. As used herein, reducing sugar indicates one or more sugars that contain aldehyde groups, or that can isomerize, i.e., tautomerize, to contain aldehyde groups, which groups may be oxidized with, for example, $Cu^{+2}$ to afford carboxylic acids. It is also appreciated that any such carbohydrate reactant may be optionally substituted, such as with hydroxy, halo, alkyl, alkoxy, and the like. It is further appreciated that in any such carbohydrate reactant, one or more chiral centers are present, and that both possible optical isomers at each chiral center are contemplated to be included in the invention described herein. Further, it is also to be understood that various mixtures, including racemic mixtures, or other diastereomeric mixtures of the various optical isomers of any such carbohydrate reactant, as well as various geometric isomers thereof, may be used in one or more embodiments described herein. While non-reducing sugars, for instance sucrose, may not be preferable, they may none-the-less be useful within the scope of the present disclosure by in-situ conversion to a reducing sugar (i.e. conversion of sucrose to invert sugar is a method known in the art). Further, it is also understood that a monosaccharide, a disaccharide, or polysaccharide may be partially reacted with a precursor to form a carbohydrate reaction product. To the extent that the carbohydrate reaction product is derived from a monosaccharide, a disaccharide, or a polysaccharide and maintains similar reactivity with the polyamine to form reaction products similar to those of a monosaccharide, a disaccharide, or a polysaccharide with a polyamine, the carbohydrate reaction product is within the scope of term carbohydrate reactant.

In one aspect, any carbohydrate reactant should be sufficiently nonvolatile to maximize its ability to remain available for reaction with the polyetheramine. The carbohydrate reactant may be a monosaccharide in its aldose or ketose form, including a triose, a tetrose, a pentose, a hexose, or a heptose; or a polysaccharide; or combinations thereof. For example, when a triose serves as the carbohydrate reactant, or is used in combination with other reducing sugars and/or a polysaccharide, an aldotriose sugar or a ketotriose sugar may be utilized, such as glyceraldehyde and dihydroxyacetone, respectively. When a tetrose serves as the carbohydrate reactant, or is used in combination with other reducing sugars and/or a polysaccharide, aldotetrose sugars, such as erythrose and threose; and ketotetrose sugars, such as erythrulose, may be utilized. When a pentose serves as the carbohydrate reactant, or is used in combination with other reducing sugars and/or a polysaccharide, aldopentose sugars, such as ribose, arabinose, xylose, and lyxose; and ketopentose sugars, such as ribulose, arabulose, xylulose, and lyxulose, may be utilized. When a hexose serves as the carbohydrate reactant, or is used in combination with other reducing sugars and/or a polysaccharide, aldohexose sugars, such as glucose (i.e., dextrose), mannose, galactose, allose, altrose, talose, gulose, and idose; and ketohexose sugars, such as fructose, psicose, sorbose and tagatose, may be utilized. When a heptose serves as the carbohydrate reactant, or is used in combination with other reducing sugars and/or a polysaccharide, a ketoheptose sugar such as sedoheptulose may be utilized. Other stereoisomers of such carbohydrate reactants not known to occur naturally are also contemplated to be useful in preparing the binder compositions as described herein. In one embodiment, the carbohydrate reactant is high fructose corn syrup or invert sugar.

In illustrative embodiments, the carbohydrate reactant is a polysaccharide. In one embodiment, the carbohydrate reactant is a polysaccharide with a low degree of polymerization. In one embodiment, the polysaccharide is molasses, starch, cellulose hydrolysates, or mixtures thereof. In one embodiment, the carbohydrate reactant is a starch hydrolysate, a maltodextrin, or a mixture thereof. While carbohydrates of higher degrees of polymerization may not be preferable, they may none-the-less be useful within the scope of the present disclosure by in-situ depolymerization.

While not limited to a particular theory, one aspect of the present disclosure is that the polyetheramine and the carbohydrate reactant are Maillard reactants that react to form a melanoidin product. In its initial phase, a Maillard reaction involves a carbohydrate reactant, for example, a reducing sugar (note that the carbohydrate reactant may come from a substance capable of producing a reducing sugar under Maillard reaction conditions). The reaction also involves condensing the carbohydrate reactant (e.g., reducing sugar) with an amine reactant, i.e., a compound possessing an amino group. In other words, the carbohydrate reactant and the amine reactant are the melanoidin reactants for a Maillard reaction. The condensation of these two constituents produces an N-substituted glycosylamine. For a more detailed description of the Maillard reaction see, Hodge, J. E. Chemistry of Browning Reactions in Model Systems *J. Agric. Food Chem.* 1953, 1, 928-943, the disclosure of which is hereby incorporated herein by reference. The literature on Maillard reactions focuses on a melanoidins produced from amino acids. The present disclosure can be distinguished from these references in that the amines described herein are polyetheramines.

As pointed out above, one aspect of the present disclosure is that the binder described herein is unexpectedly useful in applications ship-out uncured and plant uncured applications. Specifically, ship-out uncured products and plant uncured products are provided with an uncured binder so that the curing can occur at a later time and in a later place. It is desirable that the uncured applications have a good shelf life as well as cure temperatures such that the product can be cured using the existing equipment of customers or plants. Furthermore, the cure time must be sufficiently short such that the cycle time for curing the products remains low.

The following examples further illustrate specific embodiments of the invention; however, the following illustrative examples should not be interpreted in any way to limit the invention.

EXAMPLES

The ability of a composition to form a binder (or not) on curing may be demonstrated using the following procedure in a Moisture Balance:

Control Example

A solution of 180 g dextrose (1 mol) dissolved in 1020 g deionized water (15% solids solution) was prepared. 2 g of the binder solution was applied on a filter pad which is placed in a Moisture Balance and heated for 15 min at 180° C. A water insoluble polymer was not formed on the filter pad. The resulting heat treated material was essentially fully water soluble.

Comparative Example 1

Two grams of a binder solution of 50 g dextrose (0.278 mol) and 50 g hexamethylenediamine (0.431 mol), dissolved in 566.6 g deionized water (15% solids solution, pH 11.9), was applied on a filter pad which is placed in a Moisture Balance and heated for 15 min at 120° C. A brownish water insoluble polymer formed on the filter pad. An extraction of the cured filter pad using 100 g of deionized water is essentially colorless and has a pH of 6.8.

Similar results were obtained using 2 g samples of the following comparative solutions and conditions:

a. 85 g dextrose (0.472 mol), 15 g hexamethylenediamine (0.129 mol) dissolved in 566.6 g deionized water (15% solids solution, pH 10.8), heated for 15 min at 140° C.

b. 95 g dextrose (0.528 mol), 5 g hexamethylenediamine (0.043 mol) dissolved in 566.6 g deionized water (15% solids solution), heated for 15 min at 180° C.

Example 1

A solution of 1.0 g dextrose (5.55 mmol), 1.0 g (approx. 2.27 mmol) JEFFAMINE™ polyetheramine T-403 dissolved in 8.5 g deionized water (19% solids solution) was prepared. 2 g of the binder solution was applied on a filter pad which is placed in a Moisture Balance and heated for 5 min at 180° C. A brownish water insoluble polymer formed on the filter pad. An extraction of the cured filter pad using 100 g of deionized water is essentially colorless and has a pH of 7.1. JEFFAMINE™ polyetheramine T-403 is a trifunctional primary amine having an average molecular weight of 440, the chemical structure of which is shown above.

Shelf life properties and curing properties of binder compositions may be characterized and compared using measurements of viscosity (Y-axis) over time (X-axis) and using cure rates and times in a standard curing protocol, respectively.

Viscosity is measured as Brookfield Viscosity using a Brookfield Viscometer LVT, Spindle 61; Speed Range: 0.3-60 rpm and reported in Pa·s (or mPa·s).

Cure Rate and Cure Time (Wet Laid Mats Protocol):

Square Fiberglass mats (13 in×13 in) with a thickness of ⅜ in and a weight of 44 g (corresponding to 34.5 g/ft$^2$) are impregnated with a binder containing a specified percent solids (e.g., 15% solids). Excess of binder is removed by vacuum suction, and the moist mat is dried for at least 12 hours at 90° F. in an oven (recirculation). The dried mat is cut in four squares of the same dimension. The squares are stacked on top of each other, and at least one thermocouple connected to a recorder (i.e. oven mole) is placed in the middle of the stack between the 2$^{nd}$ and 3$^{rd}$ layer. A mold press with a temperature controlled platen is heated to 400° F. (204° C.). The sample with the prepared thermocouple is placed in the middle of the platen, and pressed to a thickness of 9/16 inch for a predefined time (i.e. 3.5 min, 4.0 min, 5.0 min, 6.0 min, 15 min). Each molded sample is evaluated for the degree of cure by testing evenness of the surfaces, water hold-up, and extract. A sample is deemed to be cured when the surfaces are smooth without any "bumps", the sample does not noticeably weaken when immersed in water, and no significant extract color is formed when immersing the sample in water. The temperature profile of the center of the sample is measured during the molding cycle and can be shown graphically in a plot of temperature measured by the probe (Y-axis) versus time (X-axis).

FIG. 1 (Comparison Examples) shows the cure times and the cure temperature profiles (Y-axis in ° C.) of the center of a fiberglass mat sample for different binder compositions (20% LOI compositions in the Wet Laid Mats Protocol) during a heat molding cycle (X-axis in minutes of mold time) using a mold press with a temperature controlled platen at 204° C. for Wet Laid Mats (having 20% Loss On Ignition) for binder compositions comprising carbohydrates and for phenol-formaldehyde (PF) binder compositions. DMH/HMDA (75/25) denotes a binder composition containing dextrose monohydrate (DMH) and hexamethylenediamine (HMDA) in a 75:25 weight:weight ratio. DMH/AS denotes a binder composition containing dextrose monohydrate (DMH) and ammonium sulfate (AS). PF-1 and PF-2 denote typical PF binders.

The binder compositions of FIG. 1 are prepared according to the following formulations:

| DMH/HMDA | Final Formula [g] |
|---|---|
| Deionized Water (D.I. water) | 1668.46 |

-continued

| | |
|---|---|
| Dextrose Monohydrate (DMH) | 253.03 |
| HMDA (70% Wt./.Wt aqueous solution) | 105.87 |
| Silane A1101 | 1.12 g |

| DMH/AS | Final Formula [g] |
|---|---|
| D.I. water | 4756.98 |
| DMH | 807.81 |
| Diammonium sulfate (40%, aqueous solution) | 384.45 |
| Ammonia (19%, aqueous solution) | 47.55 g |
| Silane A1101 | 3.20 g |

| PF-1 | Final Formula [g] | | |
|---|---|---|---|
| Premix 1 (50% solids) | 1001.49 | | |
| Diammonium sulfate (40%, aqueous solution) | 241.09 | | |
| Ammonia (19%, aqueous solution) | 34.01 g | | |
| Silane A1101 | 0.99 | | |
| D.I. water | 4705.28 | | |
| Diammonium Phosphate (32%, aqueous solution) | 17.14 | | |
| Premix 1 (50% solids) | | Phenol-Formaldehyde Resin (51% Solids) Urea (40%, aqueous solution) | 877.22 g 124.27 g |

| PF-2 | Final Formula [g] | | |
|---|---|---|---|
| Premix 2 (47.1% solids) | 765.39 | | |
| Toluenesulfonic Acid (66%, aqueous solution) | 29.14 | | |
| Ammonia (19%, aqueous solution) | 26.58 g | | |
| Silane A1101 | 2.58 | | |
| D.I. water | 4587.19 | | |
| Urea (40%, aqueous solution) | 346.97 | | |
| Melamine Resin | 242.14 | | |
| Premix 2 (50% solids) | | Phenol-Formaldehyde Resin (47.1% Solids) Urea (40%, aqueous solution) | 646.65 g 353.35 g |

Figure 2:
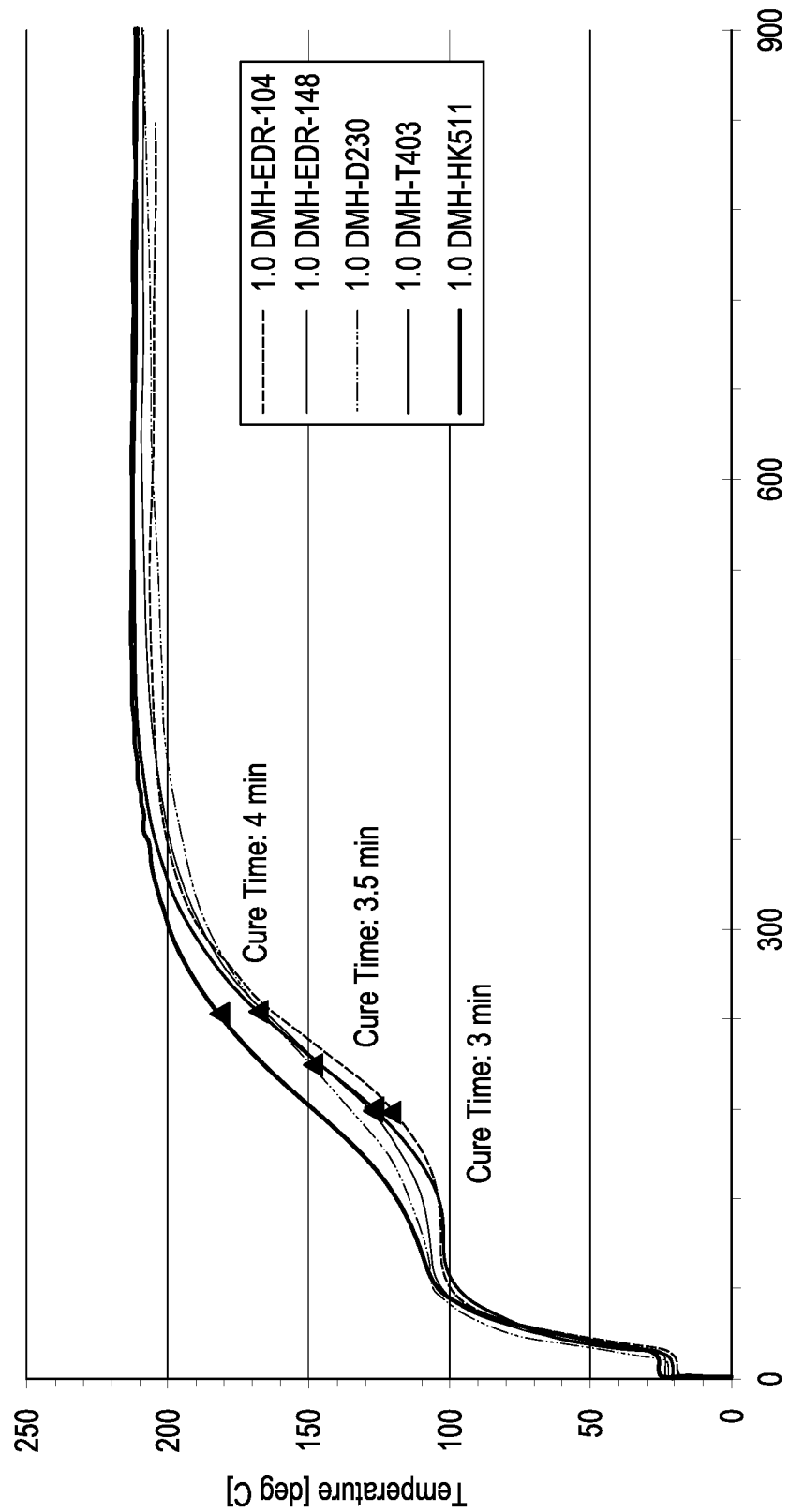
FIG. 2 (Polyetheramine Examples) shows the cure times and the cure temperature profiles for binder compositions containing dextrose monohydrate (DMH) and various polyetheramines.

FIG. 2 (Polyetheramine Examples) shows the cure times and the cure temperature profiles (Y-axis in ° C.) of the center of a fiberglass mat sample for different binder compositions during a heat molding cycle (X-axis in minutes of mold time) using a mold press with a temperature controlled platen at 204° C. for Wet Laid Mats for binder compositions containing dextrose monohydrate (DMH) and various polyetheramines (JEFFAMINE™ polyetheramine EDR-104, EDR-148, D230, T403 and HK511, see above for structural formulae) in a 1:1 carbonyl to amine ratio.

The binder compositions of FIG. 2 are prepared according to the following formulations in which DMH is dextrose monohydrate:

| | Final Formula [g] |
|---|---|
| D.I. water | 1728.80 |
| DMH | 264.03 |
| EDR-104 | 69.33 |
| Silane A1101 | 1.16 |
| D.I. water | 1731.24 |
| DMH | 187.02 |
| T-403 | 138.52 |
| Silane A1101 | 1:03 |
| D.I. water | 1737.12 |
| DMH | 242.02 |
| EDR-148 | 90.44 |
| Silane A1101 | 1.03 |
| D.I. water | 1681.96 |
| DMH | 198.02 |
| D-230 | 120.00 |
| Silane A1101 | 1.00 |
| D.I. water | 1704.63 |
| DMH | 198.02 |
| HK-511 | 124.00 |
| Silane A1101 | 1.01 |

Figure 3:
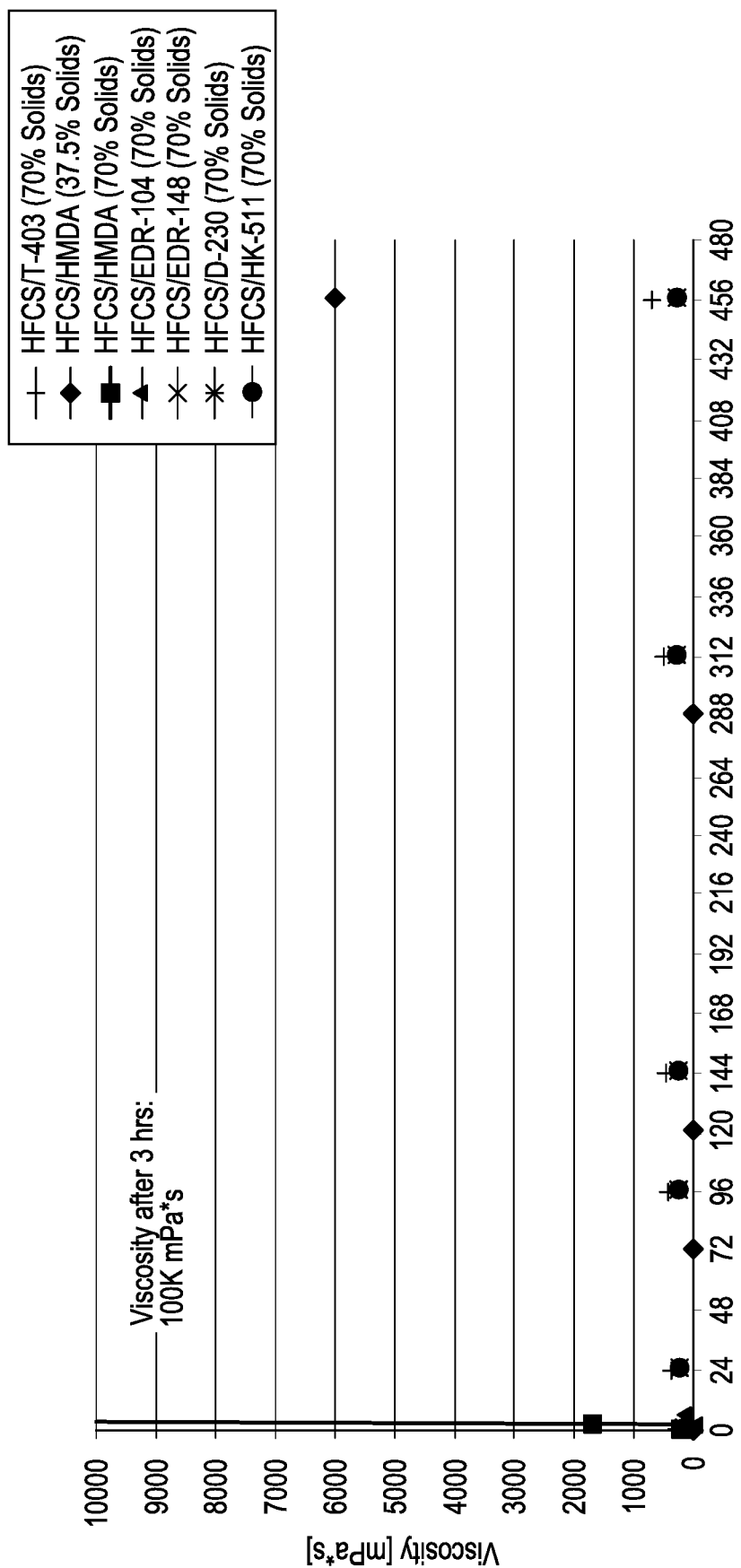
FIG. 3 shows the comparison of shelf life as the difference in increase in viscosity on standing at ambient temperature over time for binder compositions of different % solids made with high fructose corn syrup (HFCS) with hexamethylenediamine (HMDA) and with various polyetheramines.

FIG. 3 shows the comparison of shelf life as the difference in increase in viscosity (Y-axis) on standing at ambient temperature over time for binder compositions of different % solids made with high fructose corn syrup (HFCS), with hexamethylenediamine (HMDA) and with various polyetheramines in a 1:1 carbonyl to amine ratio (JEFFAMINE™ polyetheramine EDR-104, EDR-148, D-230, T-403 and HK-511, see above for structural formulae). Thus, under conditions in which the binder compositions containing polyetheramines at 70% solids were stable at 456 hours, the binder composition containing hexamethylenediamine (HMDA) at 70% solids was unstable after 3 hours, and the binder composition containing hexamethylenediamine (HMDA) at 37.5% solids was unstable after more than 288 hours.

The viscosity/time relationships for the binder compositions shown in FIG. 3 also are shown in the following table. In the table viscosity is shown in mPa·s.

| Time (hr) | HFCS/HMDA (37.5% solids) | HFCS/HMDA (70% solids) | HFCS/-EDR-104 (70% solids) | HFCS/-EDR-148 (70% solids) | HFCS/D-230 (70% solids) | HFCS/-HK-511 (70% solids) | HFCS/T-403 (70% solids) |
|---|---|---|---|---|---|---|---|
| 0 | 10.0 mPa * s | 120.0 mPa * s | 65.0 mPa * s | 203.0 mPa * s | 213.0 mPa * s | 136.0 mPa * s | 240.0 mPa * s |
| 1 | | 150.0 mPa * s | | | | | |
| 2 | | 1700.0 mPa * s | | | | | |
| 2 | | 100000.0 mPa * s | | | | | |
| 5 | | | 193.0 mPa * s | | | | |
| 24 | | | 203.0 mPa * s | 210.0 mPa * s | 246.0 mPa * s | 239.0 mPa * s | 354.0 mPa * s |
| 72 | 12.5 mPa * s | | | | | | |
| 96 | | | 225.0 mPa * s | 233.0 mPa * s | 264.0 mPa * s | 250.0 mPa * s | 405.0 mPa * s |
| 120 | 12.5 mPa * s | | | | | | |

-continued

| Time (hr) | HFCS/HMDA (37.5% solids) | HFCS/HMDA (70% solids) | HFCS/-EDR-104 (70% solids) | HFCS/-EDR-148 (70% solids) | HFCS/D-230 (70% solids) | HFCS/-HK-511 (70% solids) | HFCS/T-403 (70% solids) |
|---|---|---|---|---|---|---|---|
| 144 | | | 218.0 mPa * s | 246.0 mPa * s | 254.0 mPa * s | 259.0 mPa * s | 449.0 mPa * s |
| 288 | 18.0 mPa * s | | | | | | |
| 312 | | | 197.0 mPa * s | 263.0 mPa * s | 277.0 mPa * s | 273.0 mPa * s | 490.0 mPa * s |
| 456 | 6000.0 mPa * s | | 240.0 mPa * s | 283.0 mPa * s | 278.0 mPa * s | 273.0 mPa * s | 700.0 mPa * s |

The binder compositions of FIG. 3 are prepared according to the following formulations in which the HFCS used is Isosweet 100, A.E. Staley Manufacturing Co; 71% solids:

| | Solids % | Dry Formula | Wet Formula | Final Formula [g] |
|---|---|---|---|---|
| HFCS/T-403 70% | | | | |
| D.I. water | 0 | 0 | 3.7 | 18.47 g |
| HFCS - Isosweet 100 | 71 | 10.00 | 14.1 | 70.42 g |
| T-403 | 100 | 8.15 | 8.15 | 40.74 g |
| HFCS/HMDA 37.5% | | | | |
| D.I. water | 0 | 0 | 16.6 | 99.43 g |
| HFCS - Isosweet 100 | 71 | 10.00 | 14.1 | 84.51 g |
| HMDA (70%) | 70 | 3.22 | 4.60 | 27.62 g |
| HFCS/HMDA 70% | | | | |
| D.I. water | 0 | 0 | 0.2 | 1.21 g |
| HFCS - Isosweet 100 | 71 | 10.00 | 14.1 | 84.51 g |
| HMDA (70%) | 70 | 3.22 | 4.60 | 27.62 g |
| HFCS/EDR-104 70% | | | | |
| D.I. water | 0 | 0 | 1.4 | 8.64 g |
| HFCS - Isosweet 100 | 71 | 10.00 | 14.1 | 84.51 g |
| EDR-104 | 100 | 2.89 | 2.89 | 17.33 g |
| HFCS/EDR-148 70% | | | | |
| D.I. water | 0 | 0 | 2.0 | 9.82 g |
| HFCS - Isosweet 100 | 71 | 10.00 | 14.1 | 70.42 g |
| EDR-148 | 100 | 4.11 | 4.11 | 20.56 g |
| HFCS/D-230 70% | | | | |
| D.I. water | 0 | 0 | 3.1 | 15.29 g |
| HFCS - Isosweet 100 | 71 | 10.00 | 14.1 | 70.42 g |
| D-230 | 100 | 6.67 | 6.67 | 33.33 g |
| HFCS/HK-511 70% | | | | |
| D.I. water | 0 | 0 | 32 | 15.77 g |
| HFCS - Isosweet 100 | 71 | 10.00 | 14.1 | 70.42 g |
| HK-511 | 100 | 6.89 | 6.89 | 34.44 g |

Figure 4:
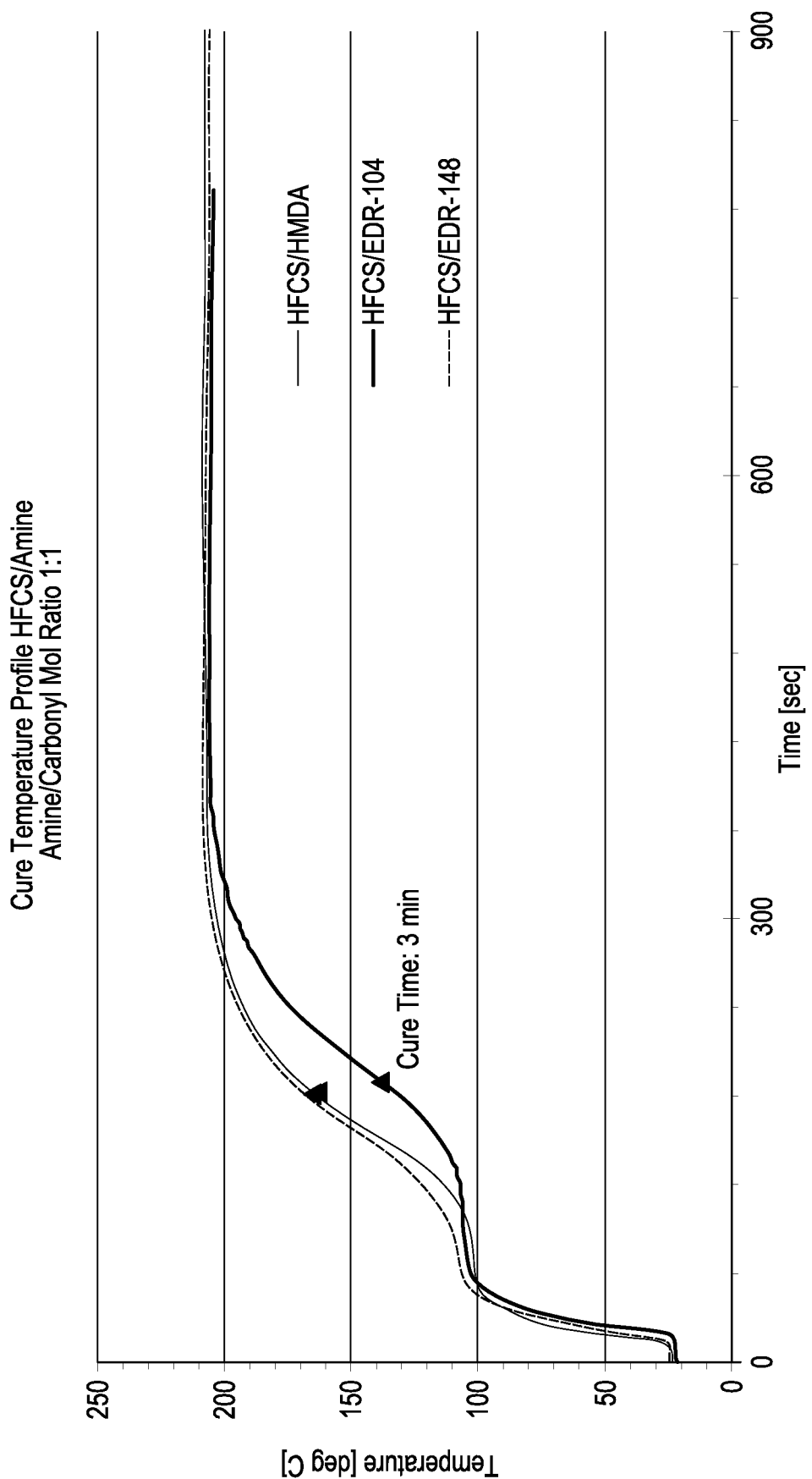
FIG. 4 shows that the binder compositions made with high fructose corn syrup (HFCS) with hexamethylenediamine (HMDA) and with various polyetheramines have similar curing times and cure temperature profiles.

FIG. 4 shows that the binder compositions made with high fructose corn syrup (HFCS), with hexamethylenediamine (HMDA) and with various polyetheramines (JEFFAMINE™ polyetheramine EDR-104 and EDR-148, see above for structural formulae) have similar curing times and cure temperature profiles.

The binder compositions of FIG. 4 are prepared according to the following formulations in which the HFCS used is Isosweet 100, A.E. Staley Manufacturing Co; 71% solids:

| | Solids % | Dry Formula | Wet Formula | Final Formula [g] |
|---|---|---|---|---|
| HFCS/HMDA | | | | |
| D.I. water | 0 | 0 | 525.3 | 2363.93 g |
| HFCS - Isosweet 100 | 71 | 75.00 | 105.6 | 475.36 g |
| HMDA (70%) | 70 | 25.00 | 35.71 | 160.72 g |
| Silane A1101 | 90 | 0.30 | 0.33 | 1.50 g |
| HFCS/EDR-104 | | | | |
| D.I. water | 0 | 0 | 535.2 | 4816.89 g |
| HFCS - Isosweet 100 | 71 | 77.00 | 108.5 | 976.10 g |
| EDR-104 | 100 | 23.00 | 23.00 | 207.01 g |
| Silane A1101 | 90 | 0.30 | 0.33 | 3.00 g |
| HFCS/EDR-148 | | | | |
| D.I. water | 0 | 0 | 538.0 | 4841.94 g |
| HFCS - Isosweet 100 | 71 | 70.20 | 98.9 | 889.86 g |
| EDR-148 | 100 | 29.80 | 29.80 | 268.20 g |
| Silane A1101 | 90 | 0.30 | 0.33 | 3.00 g |

What is claimed is:

1. A method of fabricating a fiberglass or stone wool product, comprising spraying a liquid, curable, thermosetting, aqueous, substantially formaldehyde free, binder composition, which is free of solid particles, which comprises a primary or secondary polyetheramine and a carbohydrate and which has a concentration of at least 35% solids on a collection of glass or stone wool fibers; dehydrating the aqueous binder composition disposed on the collection of glass or stone wool fibers to form an uncured fiberglass or stone wool product; and subjecting the uncured fiberglass or stone wool product to heat to cure the binder composition.

2. The method of claim 1 comprising spraying the aqueous binder composition on a collection of glass or stone wool fibers; dehydrating the aqueous binder composition disposed on the collection of glass or stone wool fibers to form an uncured fiberglass or stone wool product; storing the uncured fiberglass or stone wool product, and curing the uncured fiberglass or stone wool product by subjecting it to heat.

3. The method of claim 2 wherein the uncured fiberglass or stone wool product is stored as a roll.

4. The method of claim 1 wherein the uncured product is molded into the shape of a final product prior to curing.

5. The method of claim 1 wherein the uncured product is stored at or below about 90° F. (32° C.) prior to curing.

6. The method of claim 1 wherein the uncured product is stored at or below about 70° F. (21° C.) prior to curing.

7. The method of claim 1 wherein the uncured product is stored at or below about 50° F. (10° C.) prior to curing.

8. The method of claim 1 wherein the approximate molecular weight of the polyetheramine does not exceed 1000.

9. The method of claim 1 wherein the polyetheramine comprises a primary amine.

10. The method of claim 1 wherein the polyetheramine has an amine hydrogen equivalent weight (AHEW) of less than about 200 g/eq.

11. The method of claim 1 wherein the polyetheramine has an amine hydrogen equivalent weight (AHEW) of less than about 125 g/eq.

12. The method of claim 1 wherein the polyetheramine has an amine hydrogen equivalent weight (AHEW) of less than about 85 g/eq.

13. The method of claim 1 wherein the polyetheramine has an amine hydrogen equivalent weight (AHEW) of less than about 60 g/eq.

14. The method of claim 1 wherein the polyetheramine comprises a primary triamine.

15. The method of claim 14 wherein the polyetheramine has the following structural formula:

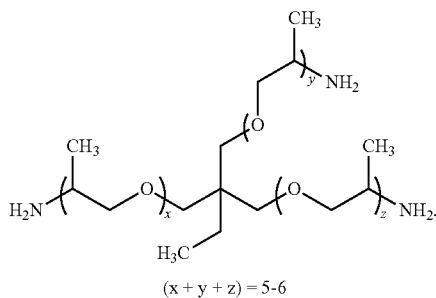

(x + y + z) = 5-6

16. The method of claim 1 wherein the polyetheramine comprises a primary diamine.

17. The method of claim 16 wherein the polyetheramine has one of the following structural formulas:

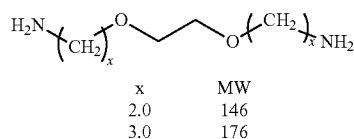

| x | MW |
|---|---|
| 2.0 | 146 |
| 3.0 | 176 |

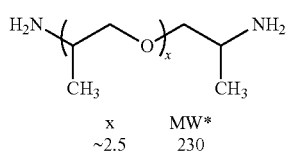

| x | MW* |
|---|---|
| ~2.5 | 230 |
| ~6.1 | 430 |

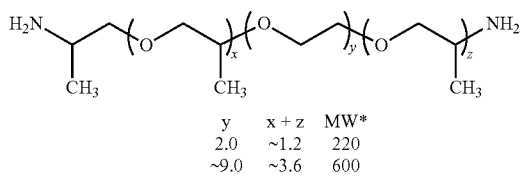

| y | x + z | MW* |
|---|---|---|
| 2.0 | ~1.2 | 220 |
| ~9.0 | ~3.6 | 600 |

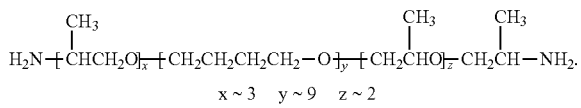

x ~ 3    y ~ 9    z ~ 2

18. The method of claim 16 wherein the polyetheramine has the following structural formula:

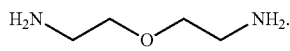

19. The method of claim 1 wherein the carbohydrate comprises a reducing carbohydrate or a combination of a reducing carbohydrate and a non-reducing carbohydrate.

20. The method of claim 1 wherein the carbohydrate comprises a monosaccharide or a disaccharide or a combination thereof.

21. The method of claim 1 wherein the carbohydrate comprises one or more monosaccharides.

22. The method of claim 21 wherein the carbohydrate comprises dextrose, fructose or xylose, or a mixture thereof.

23. The method of claim 22 wherein the carbohydrate comprises a mixture of dextrose and fructose.

24. The method of claim 23 wherein the dextrose to fructose ratio is about 80:20 to about 20:80.

25. The method of claim 1 wherein the ratio of carbohydrate carbonyl-group to polyetheramine amino-group is in the range of about 0.15:1 to about 6:1.

26. The method of claim 1 wherein the ratio of carbohydrate carbonyl-group to polyetheramine amino-group is in the range of about 0.5:1 to about 2:1.

27. The method of claim 1 wherein the ratio of carbohydrate carbonyl-group to polyetheramine amino-group is in the range of about 0.75:1 to about 1.33:1.

28. The method of claim 1 further comprising a silicon-containing compound.

29. The method of claim 28 wherein the silicon-containing compound is selected from the group consisting of gamma-aminopropyltriethoxysilane, gamma-glycidoxypropyltrimethoxysilane, aminoethylaminopropyltrimethoxysilane, an aminofunctional oligomeric silane, and mixtures thereof.

30. The method of claim 29 wherein the silicon-containing compound is gamma-aminopropyltriethoxysilane.

31. The method of claim 1 further comprising a corrosion inhibitor selected from the group consisting of dedusting oil, ammonium phosphates, sodium metasilicate pentahydrate, melamine, tin (II) oxalate, and a methylhydrogen silicone fluid emulsion.

32. The method of claim 1 wherein the binder concentration is at least 50% solids.

33. The method of claim 1 wherein the binder concentration is at least 70% solids.

34. The method of claim 1 wherein the binder concentration is at least 85% solids.

35. The method of claim 1 wherein the binder concentration is at least 90% solids.

36. The method of claim 1 wherein the viscosity is less than about 5 Pa·s.

37. The method of claim 1 wherein the viscosity is less than about 2 Pa·s.

38. The method of claim 1 wherein the viscosity is less than about 1 Pa·s.

39. The method of claim 1 wherein the increase in viscosity on standing for 1 week at a temperature not exceeding about 25° C. does not exceed 1 Pa·s.

40. The method of claim 1 wherein the increase in viscosity on standing for 2 weeks at a temperature not exceeding about 25° C. does not exceed 1 Pa·s.

41. The method of claim 1 wherein the increase in viscosity on standing for 3 weeks at a temperature not exceeding about 25° C. does not exceed 1 Pa·s.

42. The method of claim 1 wherein the increase in viscosity on standing for 4 weeks at a temperature not exceeding about 25° C. does not exceed 1 Pa·s.

43. The method of claim 1 wherein the composition is free or substantially free of an acid component.

44. The method of claim 1 wherein curing the binder composition turns the fiberglass or stone wool product brown.

\* \* \* \* \*